(12) United States Patent
Harrison

(10) Patent No.: US 7,228,959 B1
(45) Date of Patent: Jun. 12, 2007

(54) MODULAR CONVEYOR BELT WITH TIGHT TURN RADIUS

(75) Inventor: James J. Harrison, Bernville, PA (US)

(73) Assignee: Habasit AG, Reinach-Basel (CH)

( * ) Notice: Subject to any disclaimer, the term of this patent is extended or adjusted under 35 U.S.C. 154(b) by 0 days.

(21) Appl. No.: 11/369,665

(22) Filed: Mar. 6, 2006

(51) Int. Cl.
*B65G 17/06* (2006.01)
*B65G 21/18* (2006.01)

(52) U.S. Cl. ...................... 198/852; 198/778
(58) Field of Classification Search ................ 198/852, 198/778
See application file for complete search history.

(56) References Cited

U.S. PATENT DOCUMENTS

| | | |
|---|---|---|
| 4,742,907 A | 5/1988 | Palmaer |
| 4,901,844 A | 2/1990 | Palmaer et al. |
| 4,934,517 A | 6/1990 | Lapeyre |
| 5,069,330 A | 12/1991 | Palmaer et al. |
| 5,141,099 A * | 8/1992 | Baumgartner ............... 198/778 |
| 5,181,601 A | 1/1993 | Palmaer et al. |
| 5,419,428 A * | 5/1995 | Palmaer et al. ............. 198/831 |
| 5,431,275 A * | 7/1995 | Faulkner ..................... 198/853 |
| 5,775,480 A * | 7/1998 | Lapeyre et al. ............. 198/831 |
| 5,906,270 A | 5/1999 | Faulkner |
| 6,401,914 B1 | 6/2002 | Greve |
| 6,484,379 B2 | 11/2002 | Palmaer |
| 6,796,418 B1 | 9/2004 | Harrison et al. |
| 7,070,043 B1 * | 7/2006 | MacLachlan et al. ....... 198/853 |
| 7,073,662 B2 * | 7/2006 | Neely et al. ................ 198/850 |

* cited by examiner

*Primary Examiner*—Mark A. Deuble
(74) *Attorney, Agent, or Firm*—Thomas M. Freiburger

(57) ABSTRACT

A modular plastic conveyor belt achieves a very tight turning radius. The belt is configured to permit the belt module rows to collapse using an over/under slotted module geometry, allowing for modules of one row to slip over/under modules of an adjacent row at the inside of a curve. This allows greater collapse and thus much tighter turning radii. A belt of two inch pitch can achieve an approximately 0.33 turning ratio, the ratio between turn center distance and width of belt.

15 Claims, 22 Drawing Sheets

MODULAR CONVEYOR BELT WITH TIGHT TURN RADIUS

BACKGROUND OF THE INVENTION

This invention concerns modular plastic conveyor belts, particularly such belts of the type designed for radius and spiral as well as straight belt travel. The invention achieves an extremely tight turn radius.

Modular plastic conveyor belts of the general type with which this invention is concerned are described in KVP U.S. Pat. Nos. 4,901,844, 5,069,330, 5,181,601, 6,484,379 and 6,796,418. Such belts designed for radius and straight travel are in part exemplified by KVP's early and pioneering radius belt called the ALL-IN-ONE, described in U.S. Pat. No. 4,742,907. Later, KVP developed a belt with an integral side plate, that is, not requiring a separate (usually metal) side plate at the outer edge of the belt for accepting the high tension at the outside of a curve (U.S. Pat. No. 5,181,601).

Radius conveyor belts designed for tight turning radii are shown in U.S. Pat. Nos. 6,401,914, 5,906,270, and 4,934,517. There have been others as well, but none has achieved the tight turning radius of the current invention described below.

SUMMARY OF THE INVENTION

The modular plastic conveyor belt of this invention achieves a tight turning radius by virtue of a module structure very different from previous designs and by not following precepts well established in conventional modular plastic conveyor belt design. In one preferred embodiment, each module includes a narrow center spine extending laterally and securing in position a series of link end structures each extending generally parallel (or at some prescribed angle) to the direction of belt travel and defining fore and aft link ends or projections that are to be interdigited with those of an adjacent module or modules in an assembled belt. The modules, particularly the link end structures, are configured to allow very close collapse of the modules together at the inner edge on a curve, to the point that the narrow lateral spines come into contact or nearly into contact. Both forward and aft link ends are slotted, with long slots and with the slotted apertures extending approximately back to the central spine. The link ends in a series of assembled module rows alternate in two levels, high and low, with interdigited link ends and a connecting pin or rod first at the high level at one hinge joint, then at the low level at the next hinge joint, etc. The module configuration allows link ends at the collapsed inner side actually to pass over or under the next adjacent connecting rod. The result is a turning radius that can be almost as tight as 0.3 on a two inch pitch belt and 0.50 on a one inch pitch belt. Turning radius is measured by the ratio of distance from belt inner edge to belt turning center, versus width of the belt. This tight radius is compared to typical prior two inch pitch belts that have a turning radius of about 1.6, and typical one inch pitch belts with a turning radius of about 2.2.

In one preferred form of the invention, the link ends in the forward direction are staggered in position along the center spine from the link ends in the aft direction. In a given module the link ends in one direction are high and in the opposite direction are low, as noted above, with one module row low-high and the next high-low, then low-high, etc., which gives the opportunity upon collapse for the high link ends to ride over the next adjacent connecting rod, and the low link ends in the opposite direction to ride under the opposite next adjacent connecting rod. In this way a forward link end overlaps with not only the next adjacent aft link ends with which it is interdigited, but also the following aft link ends and, in some forms, there is a small overlap with even the further adjacent aft link ends. The narrow center spines at the collapsed inner side of the belt on a curve come together and essentially make contact.

The connecting rods or pins in this preferred embodiment preferably are retained in position, against rotation and at an extreme position in the slots, at the outside of the curve only. This can be in a snap-in connection at the outside edge. At the inside of the curve the pins are permitted to "float" fore and aft within the link end slots, to permit maximum collapse as described above.

In another embodiment of the invention several different configurations of modules are used in a belt. The link ends at fore and aft ends of a module are in line, not staggered as in the first embodiment. The positions of these link ends, however, from row to row to row, are progressively staggered so as not to interfere with one another in belt travel and in collapse of the inner side of the belt on curves. The link ends on collapse do not ride over or under similar link ends of the next adjacent module row, but remain to the side of those link ends.

In a third embodiment of the invention, the modules are again more universal as in the first embodiment, such that a particular module can be inverted to serve as a module in the next succeeding module row. As in both above-described embodiments, these modules have first sets of link ends, extending in one direction that are high, and second link ends in the other direction that are positioned low, so that on collapse at the inner side of a curve, the high link ends can ride over the next adjacent connecting rod and can deeply overlap with modules of succeeding rows. Again, the hinge connections are high, then low, then high, etc. This embodiment, however, includes no central spine, the module instead being formed in an undulating pattern of generally V-shaped or U-shaped link structures alternating with inverted V-shapes or U-shapes. A cross bar may be included for strength on each U-shaped undulation, but without cross bars aligned across the module row. The alternating fore and aft link ends are staggered in position.

As in the other belt configurations, the modules of this embodiment have deep slots in both the first and second sets of link ends. Also as in the other embodiments, the assembled belt has connecting rods or pins that secure high link ends to high link ends in the next row, and at the next succeeding connecting pin a set of low link ends is connected to another set of low link ends to connect the adjacent module rows at that hinge line. In this way the connected module and link end structure alternates from high to low to high, etc., from pin to pin to pin. On collapse, the high link end structure rides over the low link end structure, with high link ends extending over the next adjacent, similarly-situated low links without having to nest into those link ends.

In broad terms the invention encompasses a conveyor belt having inner interdigited modules with link ends extending in first and second directions, the link ends of both types having deep slots for connecting pin apertures. Also, the belt has provision for deep overlap at the inside of a curve, to the extend that the interdigited projections collapse to engage, or nearly to engage, the connecting pin at the deep end of the slots of the interdigited modules, and to the extent that the first link ends deeply overlap similarly situated first link ends of the next adjacent module row, and actually overlap the next adjacent connecting rod as well.

It is thus among the objects of the invention to provide a modular plastic conveyor belt capable of a very sharp turn radius, preferably about 0.3 to 0.6, through construction which enables deep overlap of modules at the inner end of a curve, to an extent not contemplated previously. These and other objects, advantages and features of the invention will be apparent from the following description of preferred embodiments, considered along with the accompanying drawings.

DESCRIPTION OF PREFERRED EMBODIMENTS

Figure 1:
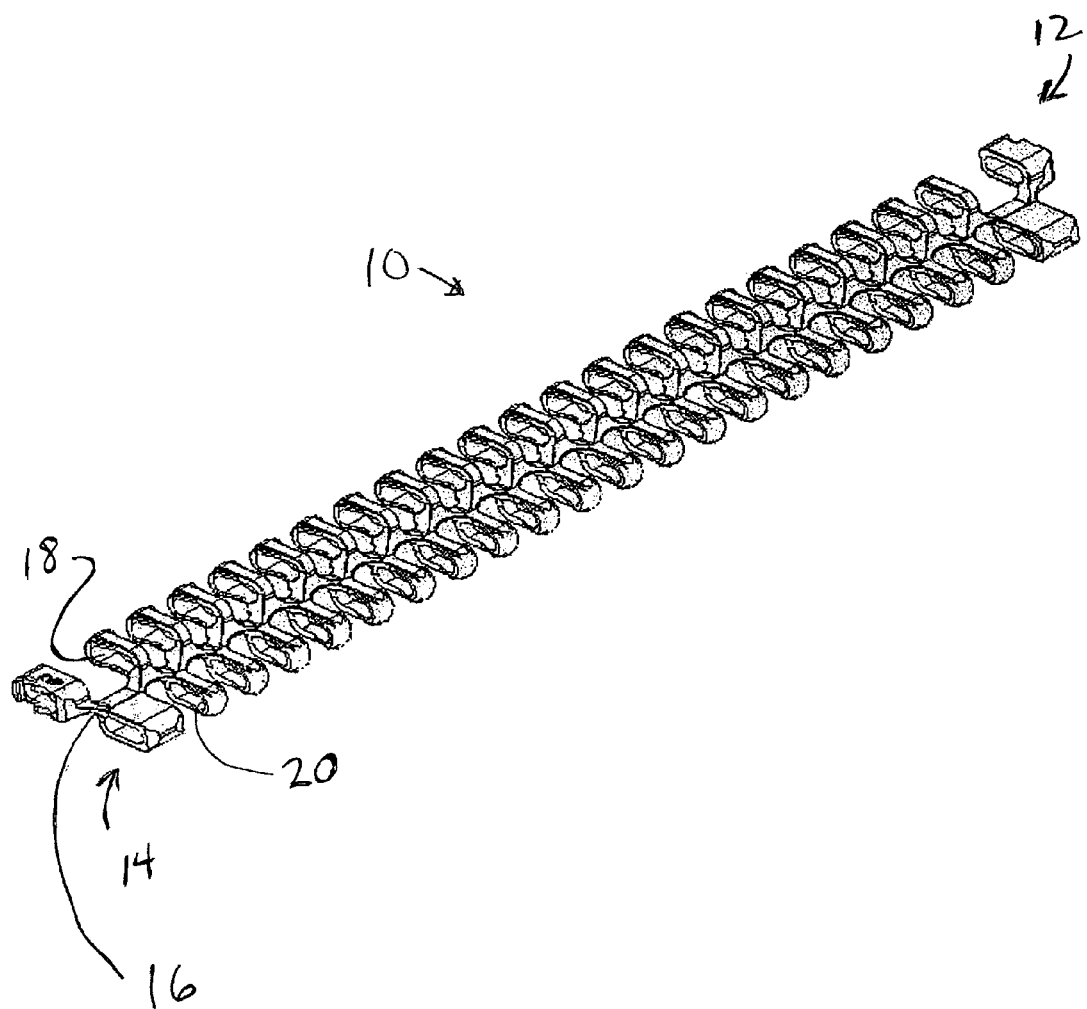
FIG. 1 is a perspective view showing a single module for a tight radius conveyor belt according to the first embodiment of the invention.
Figure 2:
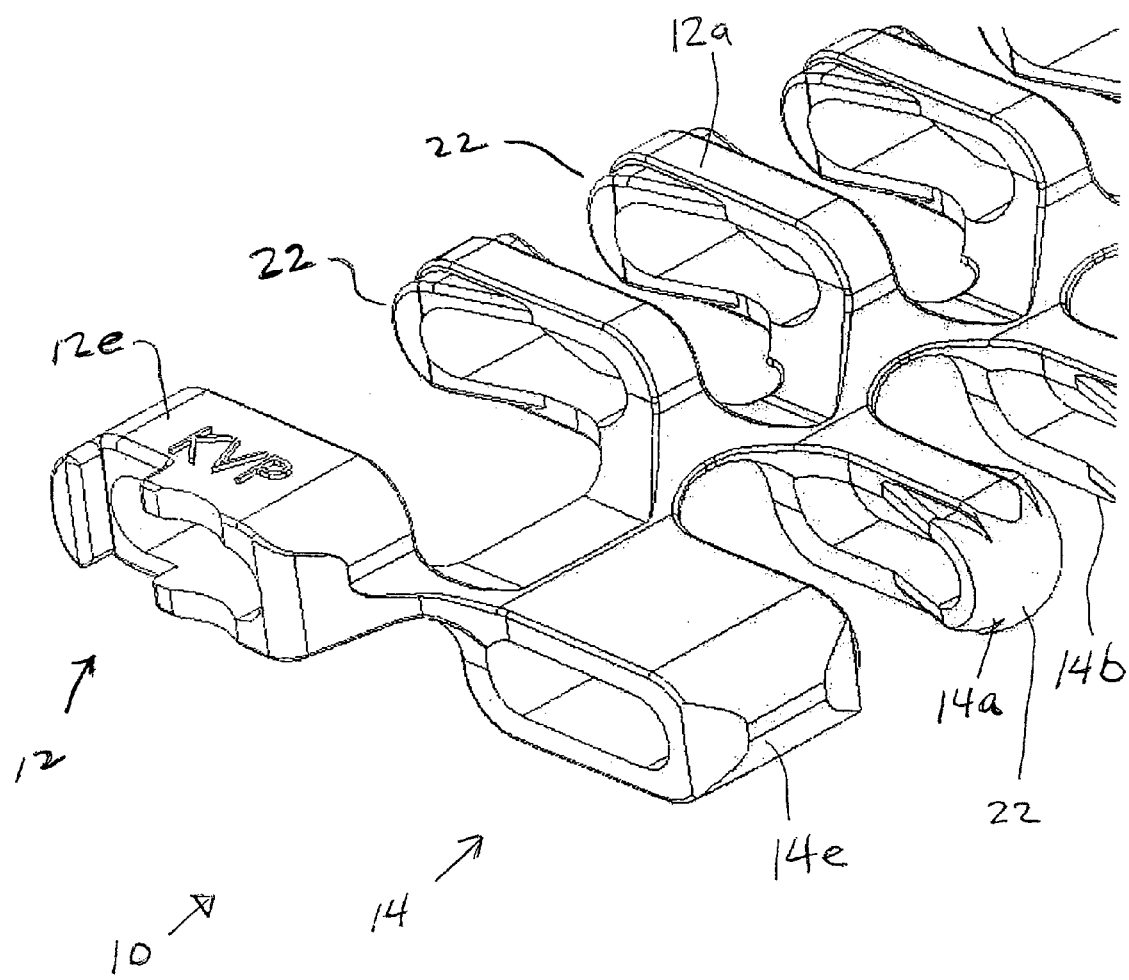
FIG. 2 is a close up perspective view of the same module.
Figure 3:
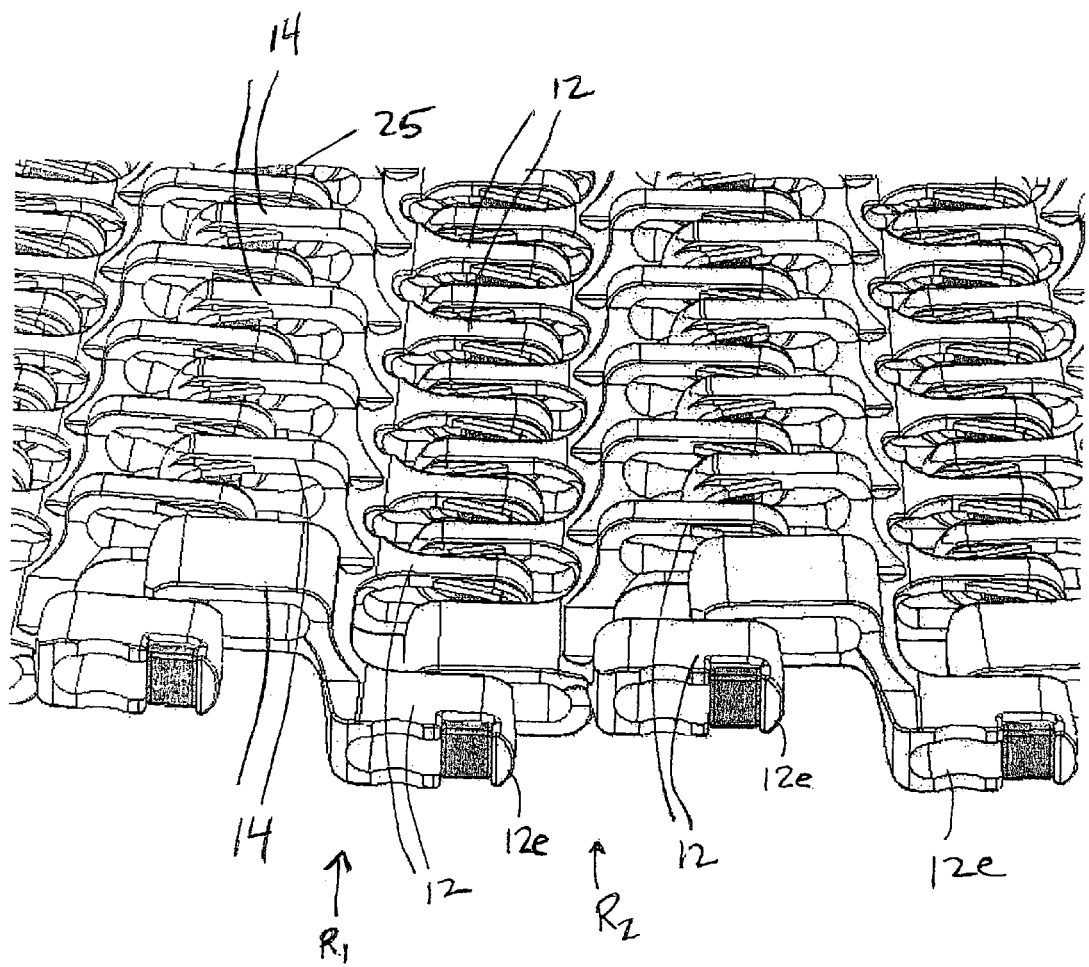
FIG. 3 is a perspective view showing a portion of a belt made up of modules of the first embodiment, with the drawing particularly illustrating the outer edge of the belt on a curve.
Figure 4:
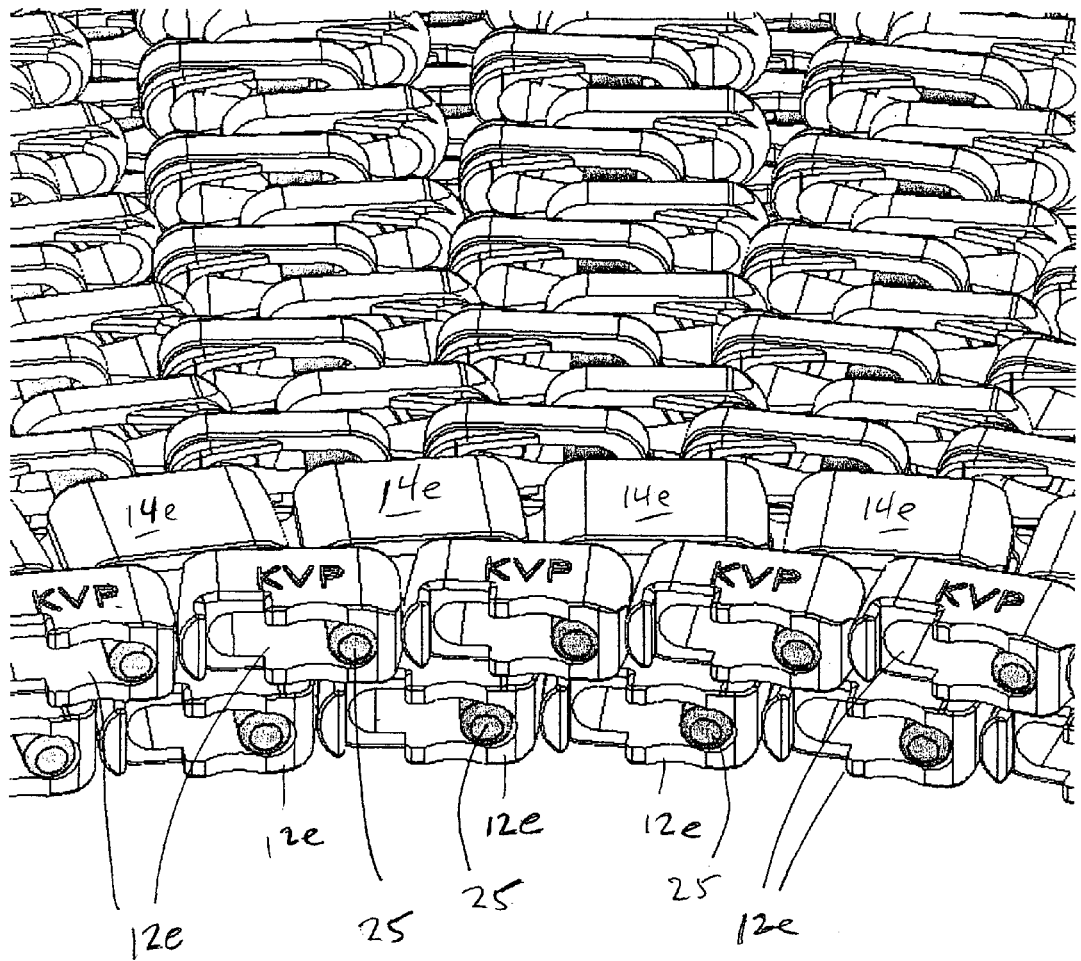
FIG. 4 is a perspective view of the assembled belt, showing a portion of the belt at the inner edge of a curve, with the modules collapsed closely together.
Figure 5:
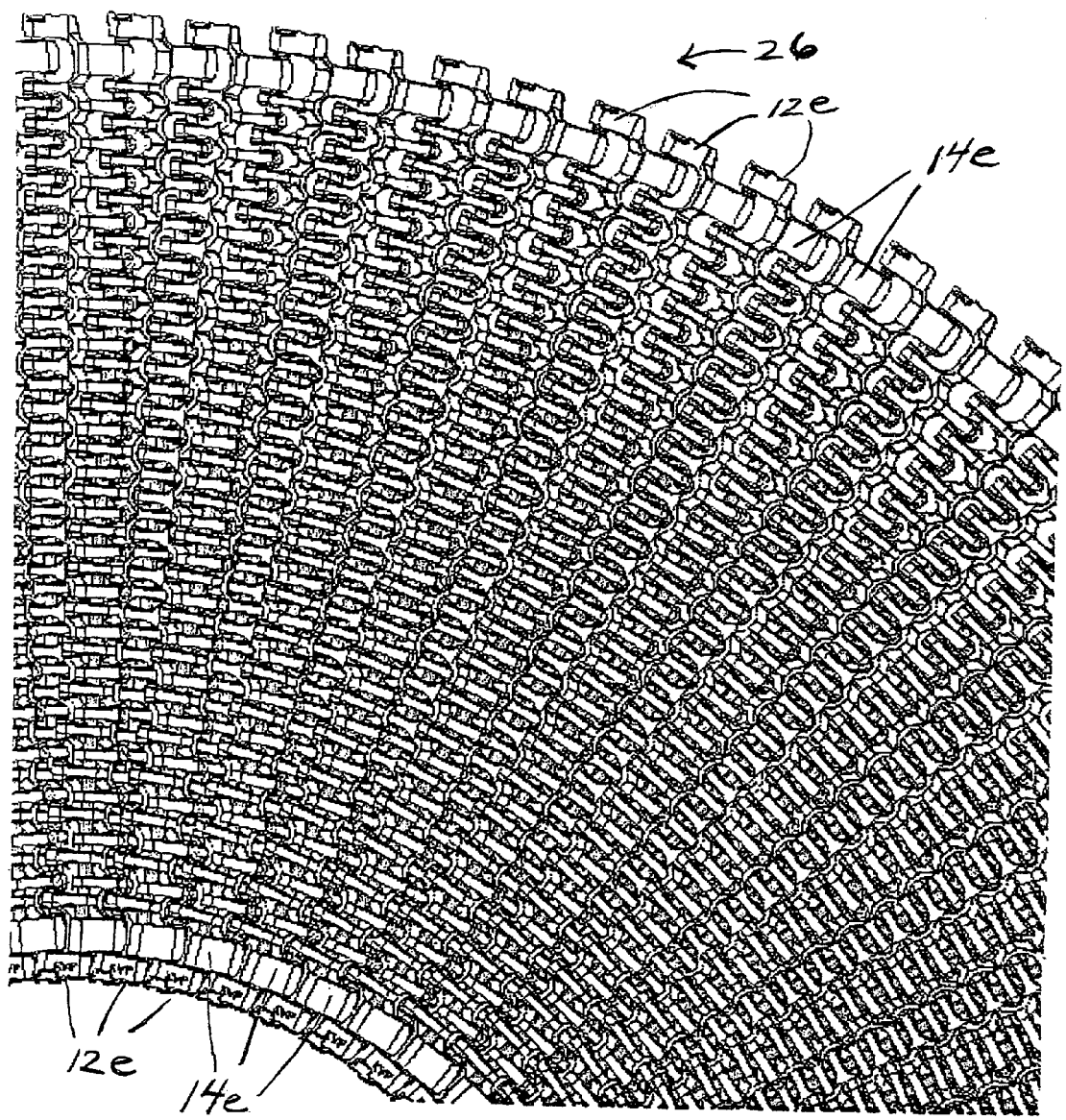
FIG. 5 is a plan view showing a portion of the conveyor belt of FIGS. 3 and 4, in a tight curve.
Figure 6:
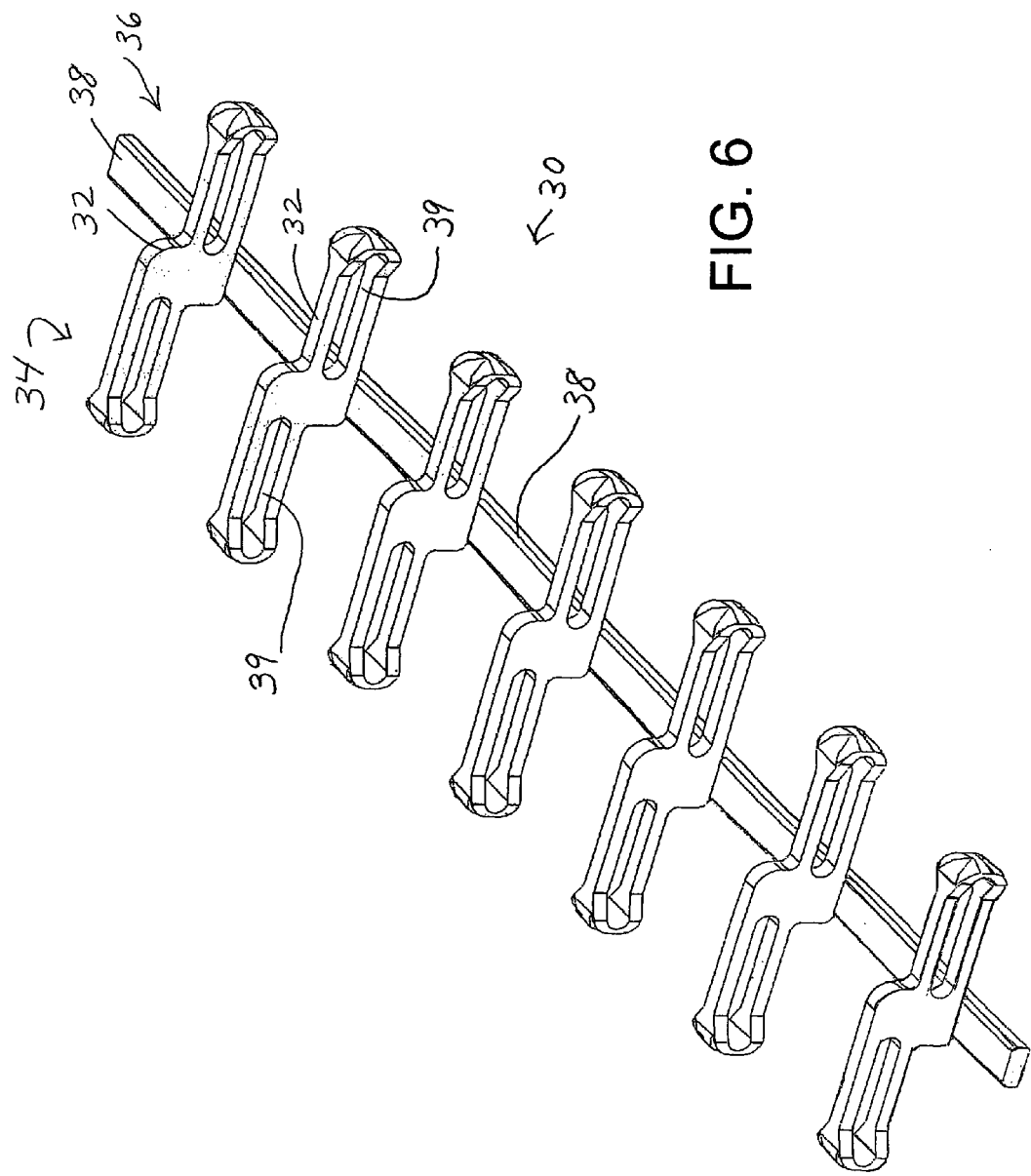
FIG. 6 is a perspective view showing a single module for forming a conveyor belt in accordance with a second embodiment of the invention.

FIG. 1 shows a plastic conveyor belt module 10 for a first embodiment of the invention, to produce a radius conveyor belt such as shown in FIGS. 3–5. As can be seen particularly in FIGS. 1 and 2, the belt has a set of first link ends 12 and a set of second link ends 14, connected by a central spine 16 which in this case is generally undulating or corrugated in shape. The "first" link ends 12 may extend in the forward or the rearward limitation, and no limitation is to be implied from the terms "first" or "second".

The module 10 is designed to enable very tight collapse of the inner end of the conveyor belt on a curve. To this end, a primary feature is that connecting pin apertures 18 and 20 in the first and second sets of link ends 12 and 14 are slotted, i.e. elongated slots, as opposed to one of the sets of link ends having simple circular apertures as in most of the prior art. This enables deep collapse at the inside of the curve.

Another feature of this embodiment is that the first and second link ends 12 and 14 are staggered in position. That is, the link ends alternate in position such that, as best seen in FIG. 2, a particular first link end 12a is positioned laterally between two second link ends 14a and 14b. This is the manner in which most KVP modules are formed. However, another important feature in this embodiment is that the first link ends 12 of the illustrated module are a high level, while the second link ends 14 of this module are at a low level. This facilitates the deep overlap discussed above, by enabling first link ends 12 at the inner edge to ride over a similarly situated (but lower) first link end in a module of a succeeding row, and for the first link end to ride over the next adjacent connecting rod as well.

Other features apparent from FIGS. 1 and 2 are that the tips 22 of the link ends, for both the first and second sets, are wider than the adjacent link end structure, typical of a belt designed for radius travel. Also, the edge link ends of both sets, 12e and 14e, are heavier and wider, with added strength for accepting tension at the outside of a curve. In the embodiment illustrated, the link at both edges are formed in this way. This is another typical feature of KVP radius conveyor belts.

FIGS. 3, 4 and 5 show examples of an assembled belt. These examples illustrate the belt with only one module per row, but it is understood that the belt can be in a variety of widths, with each row assembled of one or multiple modules, illustrated in the patents referenced above, which are hereby incorporated by reference. In FIG. 3 the outside edge of a curve is illustrated, and the drawing shows that the module 10 shown in FIG. 2 is in the position shown only in every other module row. Between such module rows, the same module can be used but is inverted. From FIG. 1 it can be seen that a module row $R_1$ of FIG. 3 has at its outer edge the flipped-over near end of the FIG. 1 module, and an adjacent module row $R_2$ in FIG. 3 has at its outer edge the far end of the module of FIG. 1, as viewed from the opposite end of FIG. 1.

FIG. 3 shows that the module rows are attached together by the connecting pins or rods 25 such that high link ends are attached together by one pin, and low link ends are attached together by a succeeding pin. Thus, the modules are attached with link ends high to high and low to low, as illustrated. Therefore, "first" link ends 12 of one module row are low, while "first" link ends 12 of a succeeding module row are high. The terms "first" and "second" as used herein are intended to mean link ends oriented in a particular direction (although either one could represent either the forward direction or the rearward direction, without limitation). The reason for this high/low arrangement is to effectuate tight collapse, as shown in FIGS. 4 and 5, where the inner edge of the belt can be seen. FIG. 4 shows that a particular first link end 12, the outermost or innermost, edge link end 12e, laps under the next first link end 12 and preferably comes into contact with the next succeeding first link end 12e at the same level, this illustration being the low level. The low, first link end 12e thus passes underneath the first, high link end 12e of the next adjacent row in order to contact the first link end 12e which is two rows away. As can be seen, all of the link ends 12e, both high and low, cluster together at two levels. The drawing also shows that a particular edge link end 12e (as well as a few further link ends moving toward the inner part of the belt) cross over the position of the next adjacent connecting pin 25.

The "second" edge link ends 14e, which extend in the opposite direction from the first link ends, are also shown clustered close together, although not contacting, in FIG. 4. These, too, are at two different levels. Note that in FIG. 4 the outer link ends 12e, at both upper and lower levels, are shown in contact to thus define a limit to collapse of the belt at the inner edge. The rods 25 are also shown "bottomed out" at the extreme inner ends of the slots of link ends 12e and 14e. Either one of these contact situations can define the maximum collapse of the belt, with contact preferably occurring in both the case of the outermost link ends and the rods, although usually, due to manufacturing tolerances, there will only be substantial contact if not exact contact, at one of these locations.

FIG. 3 also shows a type of retention for the connecting rod or pin 25. Other types of rod retention could be used. In this form, a shaped rod head 23 is formed at one end of the connecting pin or rod 25, at the side that will be dedicated to the outside of a curve or curves. This manner of retention fixes the rod in position, at the extreme end of a slotted aperture for travel at the outside of the belt. By this means of retention the rod is prevented from sliding fore/aft at the outside edge of the belt, and also from rotation or lateral migration. The head 23 is formed only at the outer side of the rod and is seated in a pin saddle 24 that is formed in the outermost link end as shown in FIG. 3, or in other structure at the outermost edge of the belt. The head can be of a size to snap firmly into the similarly shaped pin saddle for firm retention, or the saddle can simply retain the head against rotation and fore/aft sliding, with axial retention accomplished with a snap ring inside the link end structure. Such a snap ring generally is an annular ridge on the rod or pin, and an obstruction within the link end, which can also be an annular ring, the rod being fixed against axial movement when the snap ring is forced past the interfering link end structure. In this case, since slotted apertures are in both types of link ends, the link ends 12e at the outer edge would have to be formed with a special internal structure.

As an alternative, the rods or pins can be retained by using rod heads or other structure that is retained in a different manner, and which may allow fore/aft sliding, especially for the case where the belt may travel through both left and right turns. Preferably the rods are headed at only one end, to avoid the need to perform rod heading at an opposite end after assembly.

FIG. 5 shows a portion of a conveyor belt 26 made up of the modules 10. These can be either single-module rows or multiple-module rows, such as modules formed of alternating two-module and three-module rows, assembled in bricklaid or staggered relationship as is typical of wide modular radius conveyor belts. The clustered link ends 12e and 14e are shown at the inner edge of the curve, while at the opposite edge they are shown at maximum extension.

FIGS. 6 through 13 show another principal embodiment of the invention. As shown in these drawings, the modules 30 of this embodiment have link end structures 32 that are not staggered in position from first set 34 to second set 36, but the link end structures are continuous, essentially straight structures 32 as shown. These link end structures form high first link ends 34 and low second link ends 36, connected together by preferably integrally formed central spine 38 extending laterally across the module. The spine 38 is at the top of an assembled conveyor belt, but the bottoms of the modules and of the belt portions are illustrated in these drawings for clarity. Also as in the previous embodiment, the link ends 34 and 36 have elongated slotted apertures 39.

Figure 7:
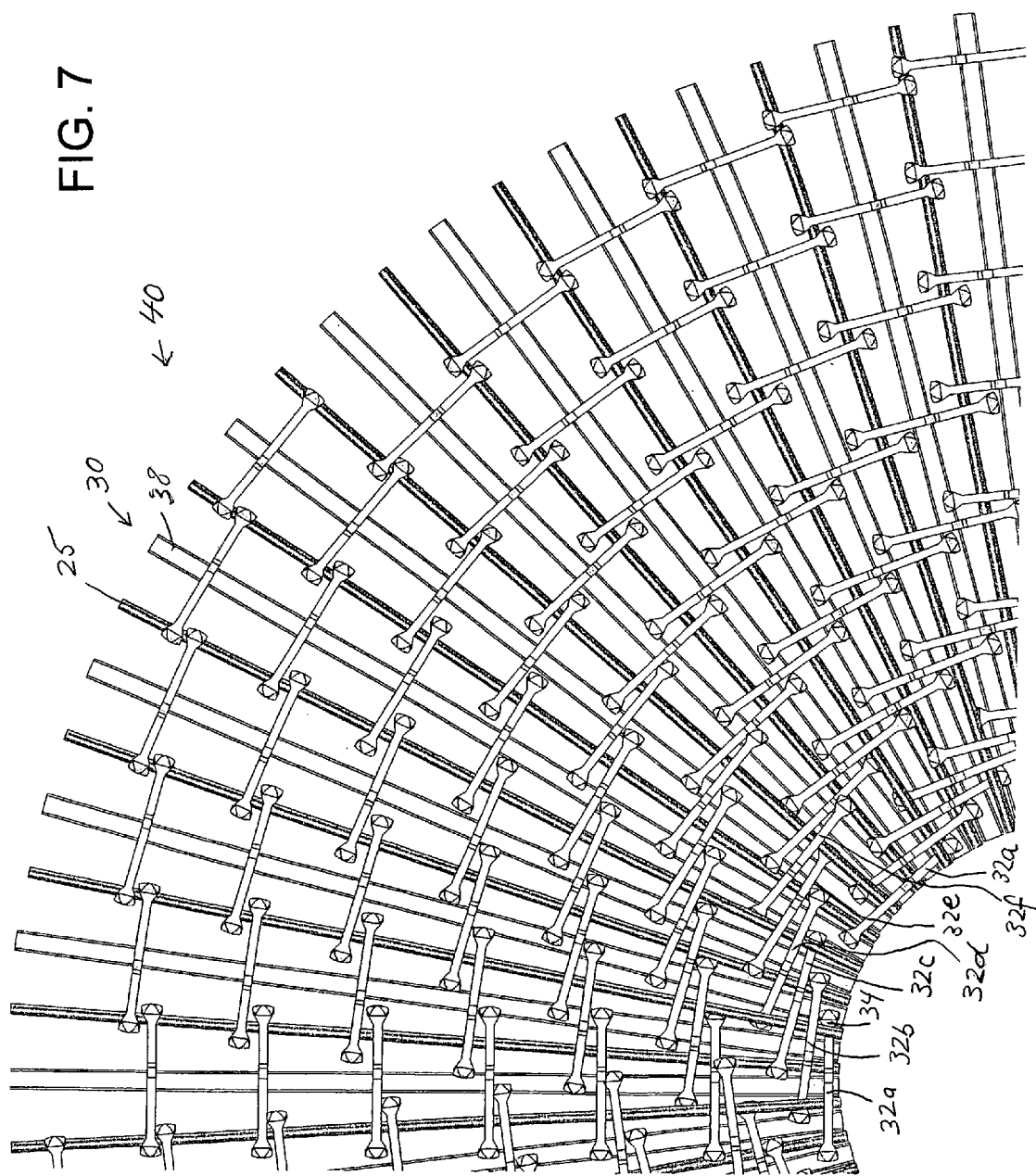
FIG. 7 is a plan view showing a conveyor belt assembled of modules such as shown in FIG. 6. The drawing shows the underside of the belt.
Figure 8:
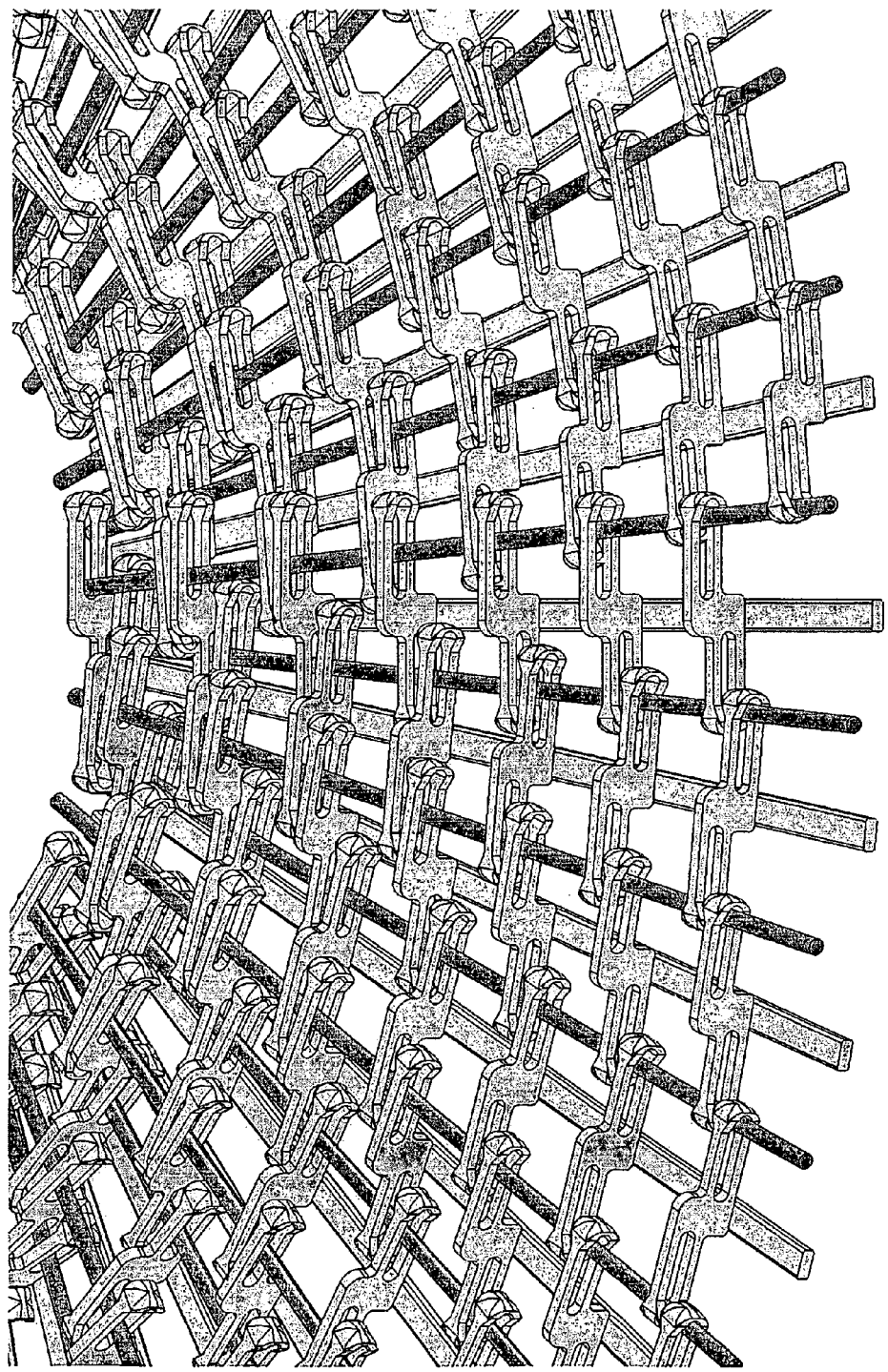
FIG. 8 is a perspective view from the underside of the assembled conveyor belt of FIG. 7, showing a portion of the belt in a curve, particularly the outer side of the curve.

FIG. 7 shows schematically a section of a conveyor belt 40 that has the modules 30 of the invention. Connecting rods 25 are seen securing adjacent module rows together, the rods being engaged by outer boundaries or edges of the aperture slots 39 at the outer edge of the belt, and by inner ends of these aperture slots at the inner side of the belt on a curve. As seen in FIGS. 7 and 8, in this embodiment of the tight-radius conveyor belt of the invention, the link ends do not ride over or under similarly-situated link ends, but rather remain alongside the link ends of adjacent rows at the inner edge of the belt. The link ends do ride over the next adjacent connecting pin at the inner edge. To facilitate this form of collapse, the modules 30 are in different configurations, at least at the edges of the belt. In multiple-module rows (not illustrated in FIG. 7), center modules could be identical but staggered from row to row. At least at edge modules, however, multiple different forms of modules are provided for this embodiment. In the form shown in FIG. 7, six different module types are included, as can be seen at the outer edge or the inner edge of the belt. At the inner edge, a first link end structure 32a is staggered laterally from the first edge link end structure 32b of the next module row. Link end structures 32c, 32d, 32e and 32f are shown as progressively staggered toward the center of the belt, followed by a next module row having the innermost link end structure 32a again at the innermost position at the inner edge.

Figure 9:
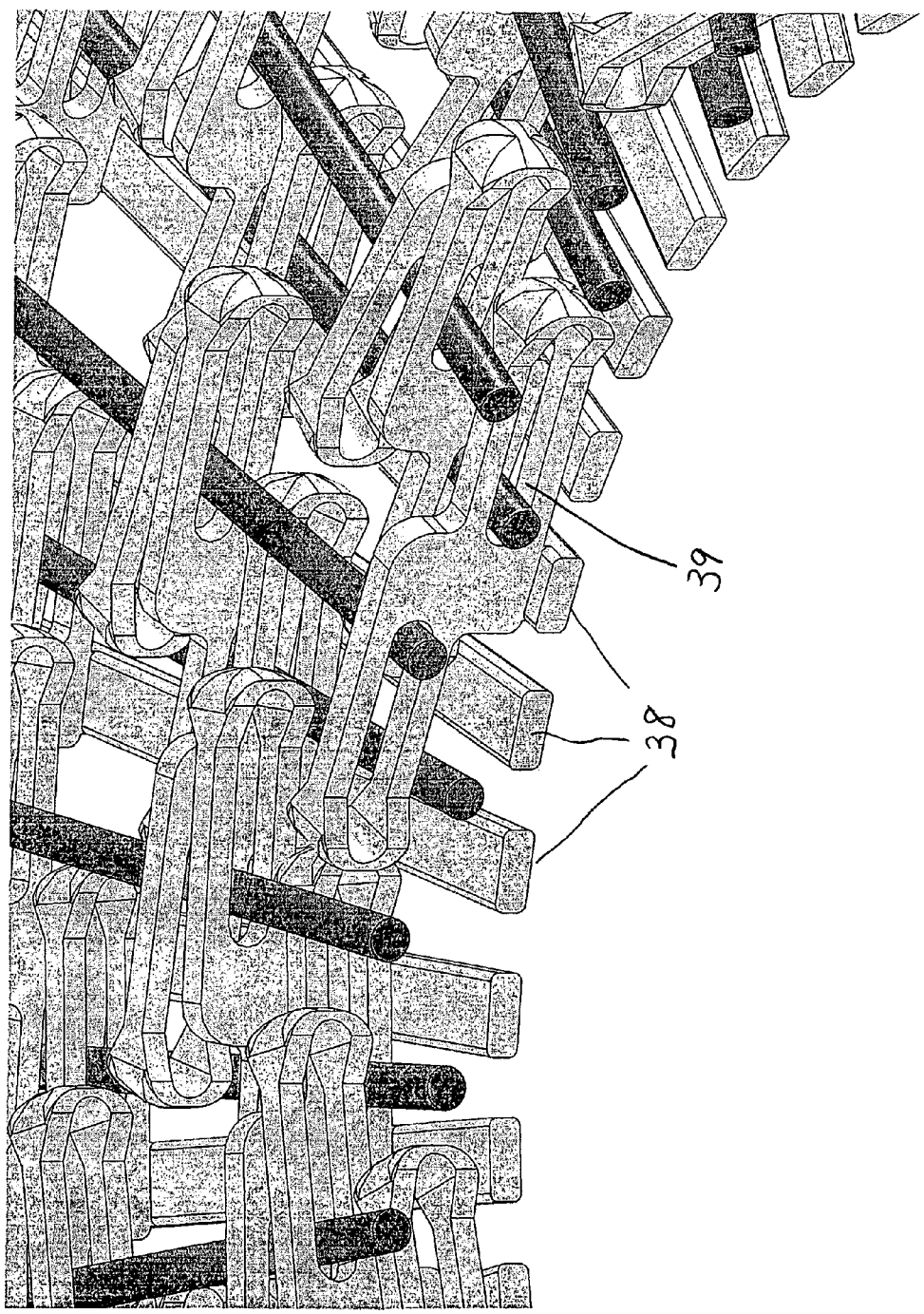
FIG. 9 is a perspective view showing the underside of the belt and illustrating the closely collapsed module rows at the inner edge of the belt on a curve.
Figure 10:
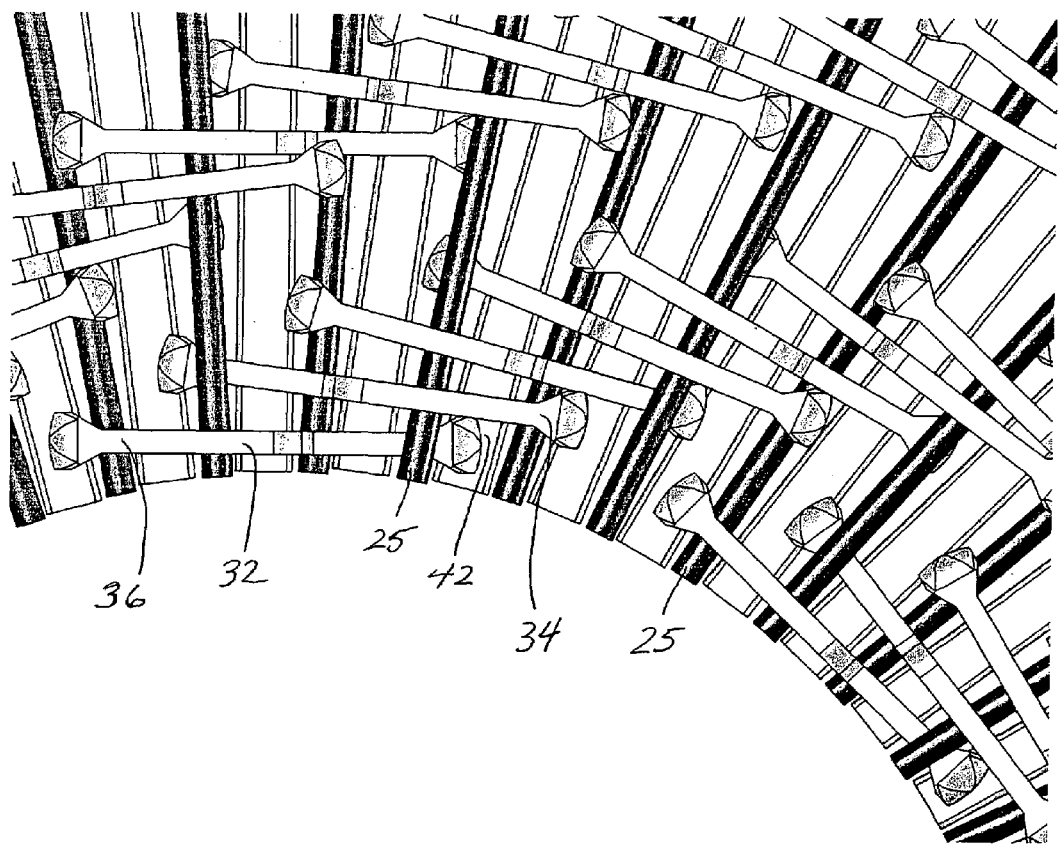
FIG. 10 is a bottom plan view showing a portion of the inner edge of the belt on a curve.

FIG. 7 also shows the link ends extending over and under the next adjacent connecting pins 25, and overlapping deeply the positions of the link ends of adjacent module rows. Thus, in contrast to the outer edge, where the link ends are at maximum extension and the rod engages the outer end of the aperture slots as shown, at the inner edge the first link ends 34 of the edge link end structures 32a overlap with link end structures of the next adjacent module row, of the further adjacent module row, and even, to a slight extent, the next further module row. This can also be seen in FIGS. 8, 9 and 10, showing details of the overlapping link ends. FIG. 9 shows that the limitation in this preferred embodiment to collapse is the rods 25 being at the deepest ends of the apertures at the inner edge. The limitation could be defined differently, by the contacting of the center spines 38, if the aperture slots 39 were made slightly deeper. Another limitation that comes into play can be the interfering of the link end structures 32 laterally at the inner side of a curve. This can be removed as a limitation by configuring the high and low link ends so that the ends of first link ends actually slide over or under the first link ends of adjacent modules, such as shown at 42 in FIG. 10. In the illustrated configuration do pass over and under one another to some small extent at and near the inside edge of a belt at a curve.

FIGS. 6–13 showing this embodiment are somewhat schematic in that the manner of capture of the connecting pins 25 is not shown. This can be via rod heading, for example, or by a rod locking device at the outer edge (as in FIGS. 1–5), assuming the belt only undergoes steep turns in one direction (otherwise the locking of rod position at the outer edge will allow only partial collapse at that edge when the belt turns in the opposite direction).

Figure 11:
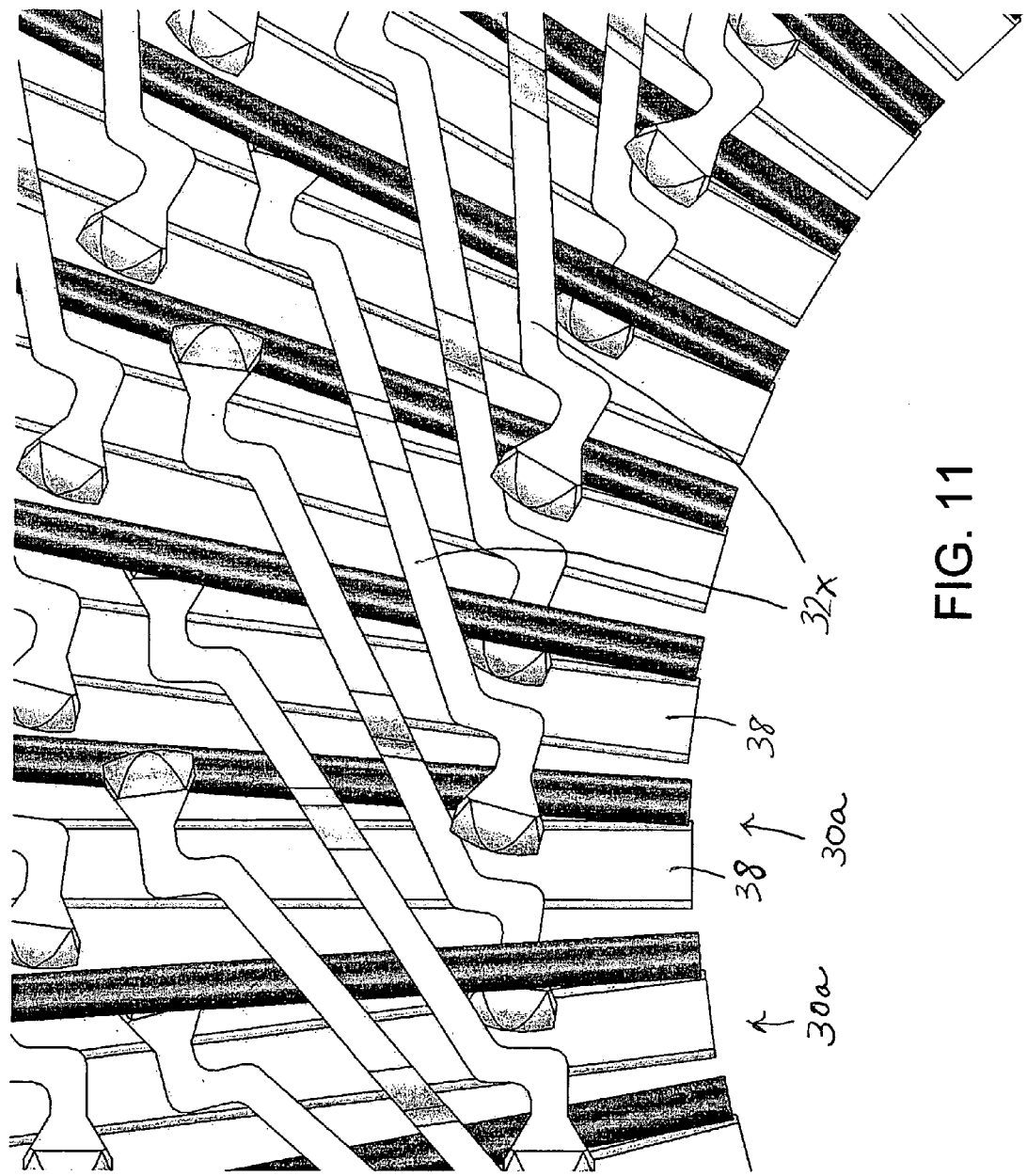
FIG. 11 is a bottom plan view showing a portion of a somewhat modified version of the embodiment of FIGS. 6–10.

FIG. 11 shows a modification of the embodiment of FIGS. 6–10. Here, the modules 30a have link end structures that are again generally linear, but are angled relative to the center spine 38. The angling helps the modules to nest together at the inner edge, without requiring multiple staggered link end structures, i.e. different versions of modules, as in the embodiment of FIGS. 6–10. As seen in FIG. 11, the link end structures 32x are at the same position laterally from module row to module row, with the angling of the link end structure still enabling tight collapse without interference. From module row to module row, the assembly is low-to-low and high-to-high, as in the main embodiment.

Figure 12:
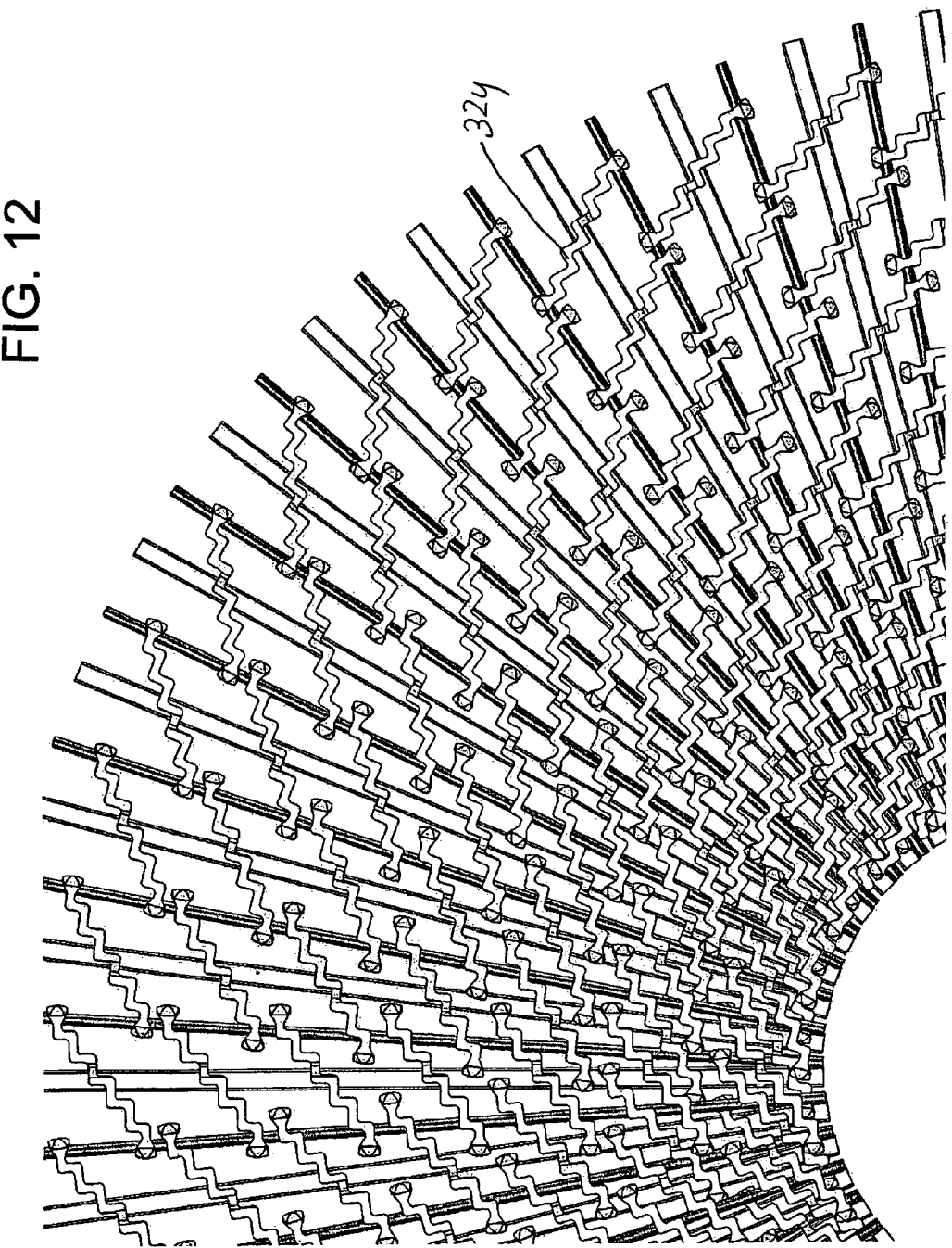
FIG. 12 is a bottom plan view showing a portion of a belt which constitutes another modification of the belt and modules of FIGS. 6–10.
Figure 13:
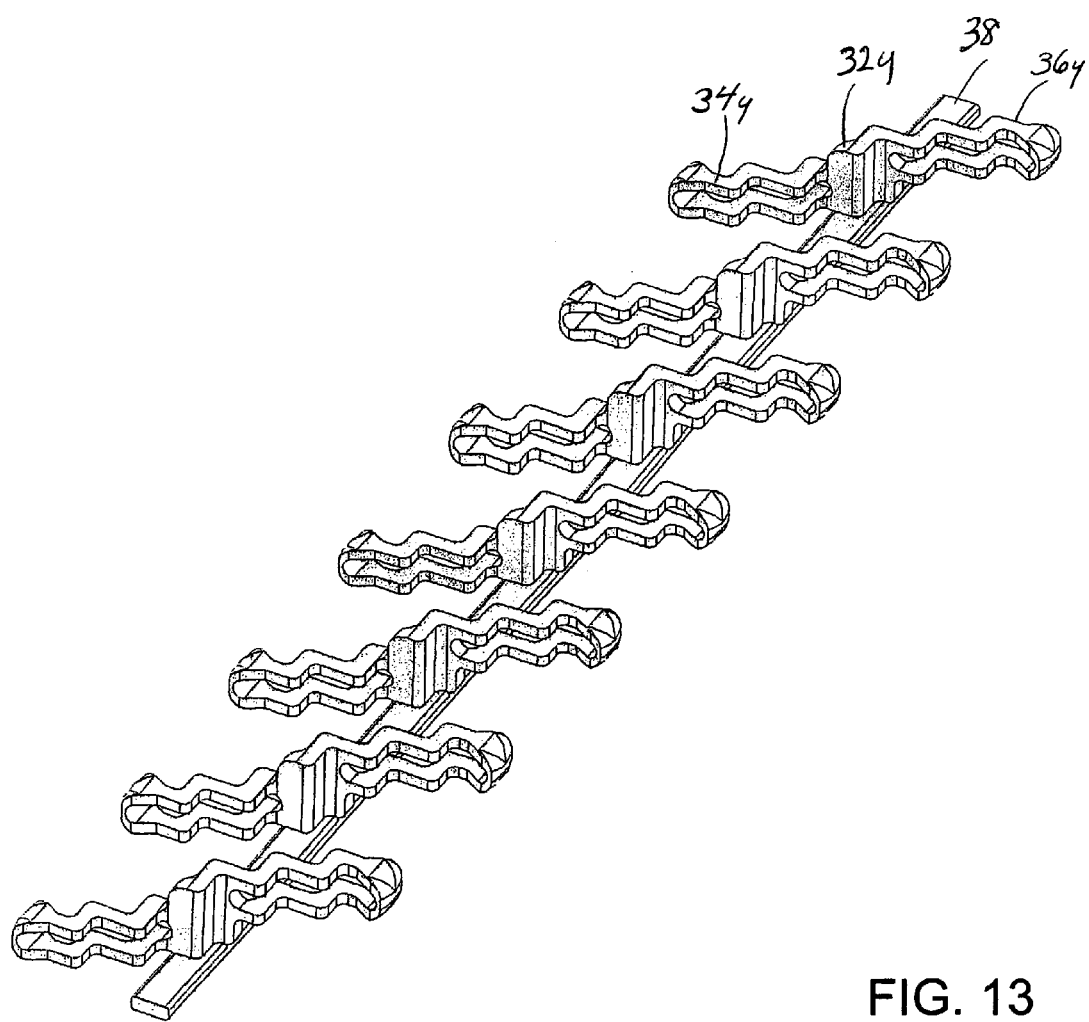
FIG. 13 is a perspective view showing a single module of the belt shown in FIG. 12.

FIGS. 12 and 13 show another variation of the embodiment of FIGS. 6–10. Here, the link end structures 32y are again essentially angled, for the same purpose discussed above, but they are stepped in configuration. Each link end 34y and 36y has two essentially right-angled steps, and the link end structure is also stepped at the location of the central spine 38, as illustrated. Another benefit of this embodiment is that the step link ends or knuckles 34y and 36y will act as tension springs under belt loading at the outer edge of the belt on a curve. The high tension at the outer edge can thus actually stretch the belt slightly at the outer edge, making the turn radius of the assembled belt even tighter.

Figure 13A:
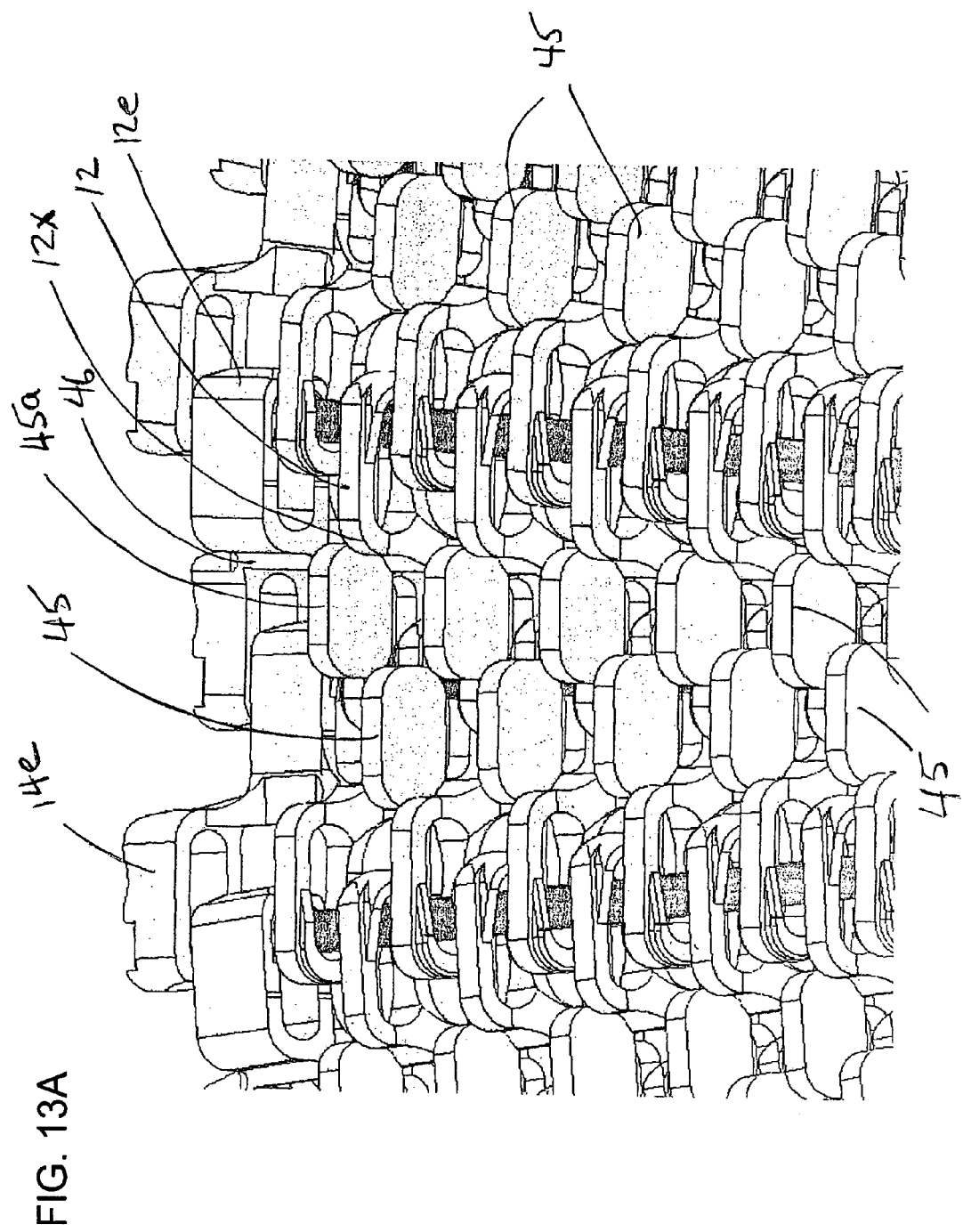
FIG. 13A shows a modification of the belt shown in FIGS. 1–5.
Figure 13B:
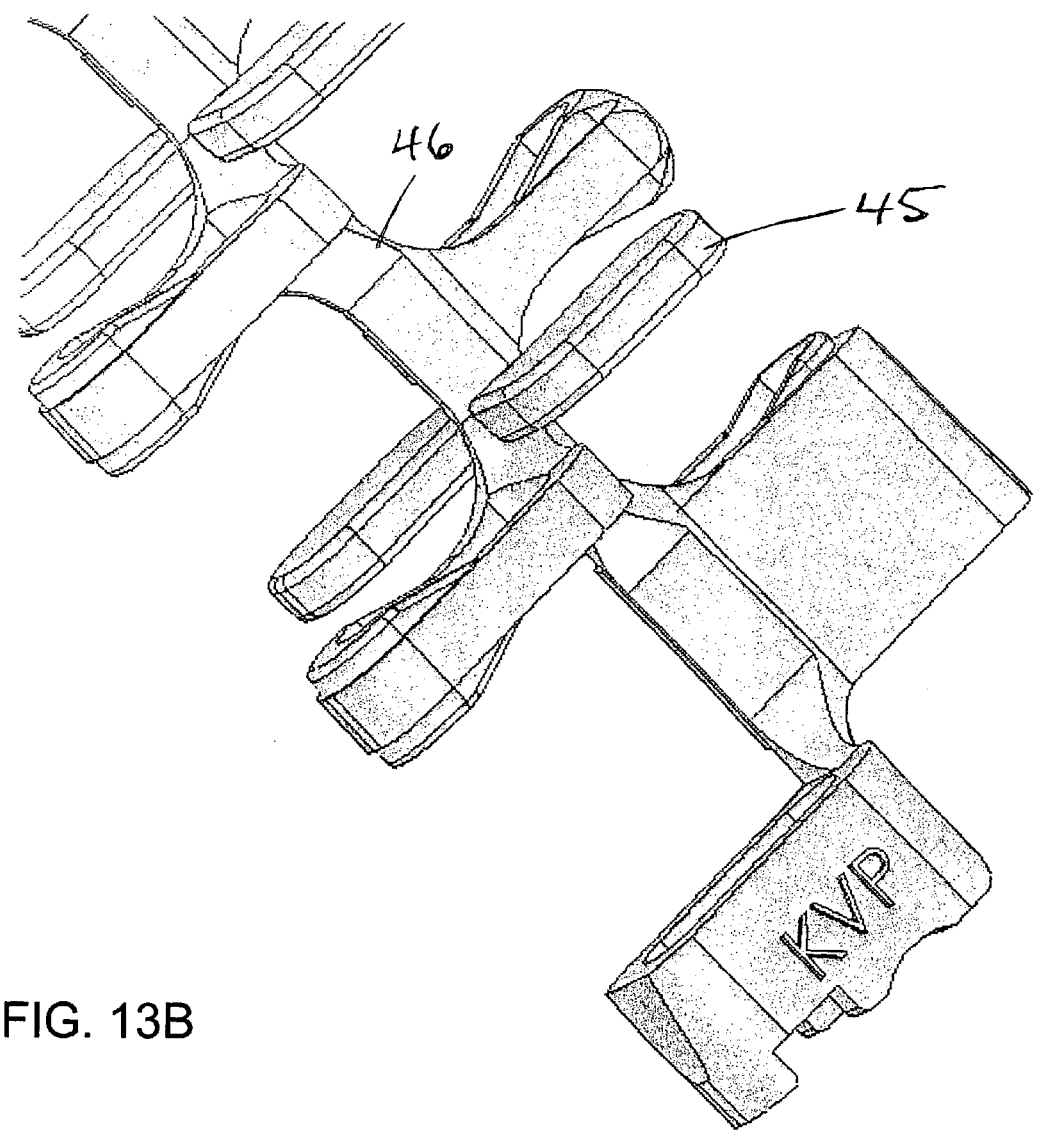
FIGS. 13B, 13C and 13D are further views of a module and the belt as shown in FIG. 13A.

One effect of the high and low link ends of the above described embodiments is that the modules under tension at the outer edge of a belt tend to rotate slightly about the center spines. This can affect the collapse of the belt at the inner edge, although a belt can have sufficient resiliency that the slight rotation does not fully transfer to the inner edge. Also, the rotation about center spines can provide a benefit of shared load on the rod, i.e. shear loading is shared among more link ends, over a wider area, in the outer region. One solution to the potential problem of spine rotation is to include a "dummy" link end. Dummy link ends are shown at 45 in FIG. 13A, in a belt generally of the type shown in FIGS. 1 through 5. These relatively narrow dummy link ends 45 are positioned where they will not interfere with the full collapse of the belt, and they provide the benefit of filling a gap particularly at and near the outside of the belt on a curve, where the extended belt undulates in height in the direction forward/back of the belt. And, they tend to prevent or lessen the rotation of the belt modules about their spine under the high tension of the outside of a belt (the tendency of the alternating high and low connecting pins to align in one plane at the outer edge under tension). The dummy link ends 45 shown in FIG. 13A are connected (molded integrally) with the spine, generally indicated at 46, of the module. See also FIGS. 13B, 13C and 13D. FIG. 13B shows the dummy link ends 45 as extending above and below the spine 46 and integrally molded with the module. Thus, the particular dummy link end 45a in FIG. 13A is connected to the spine 46 at a position close to but spaced from a spine-adjacent end 12x of one of the slender link ends 12. At the edges of the belt, i.e. at the region of the wider, heavier link ends 12e and 14e, these dummy link ends are not present.

Figure 13C:
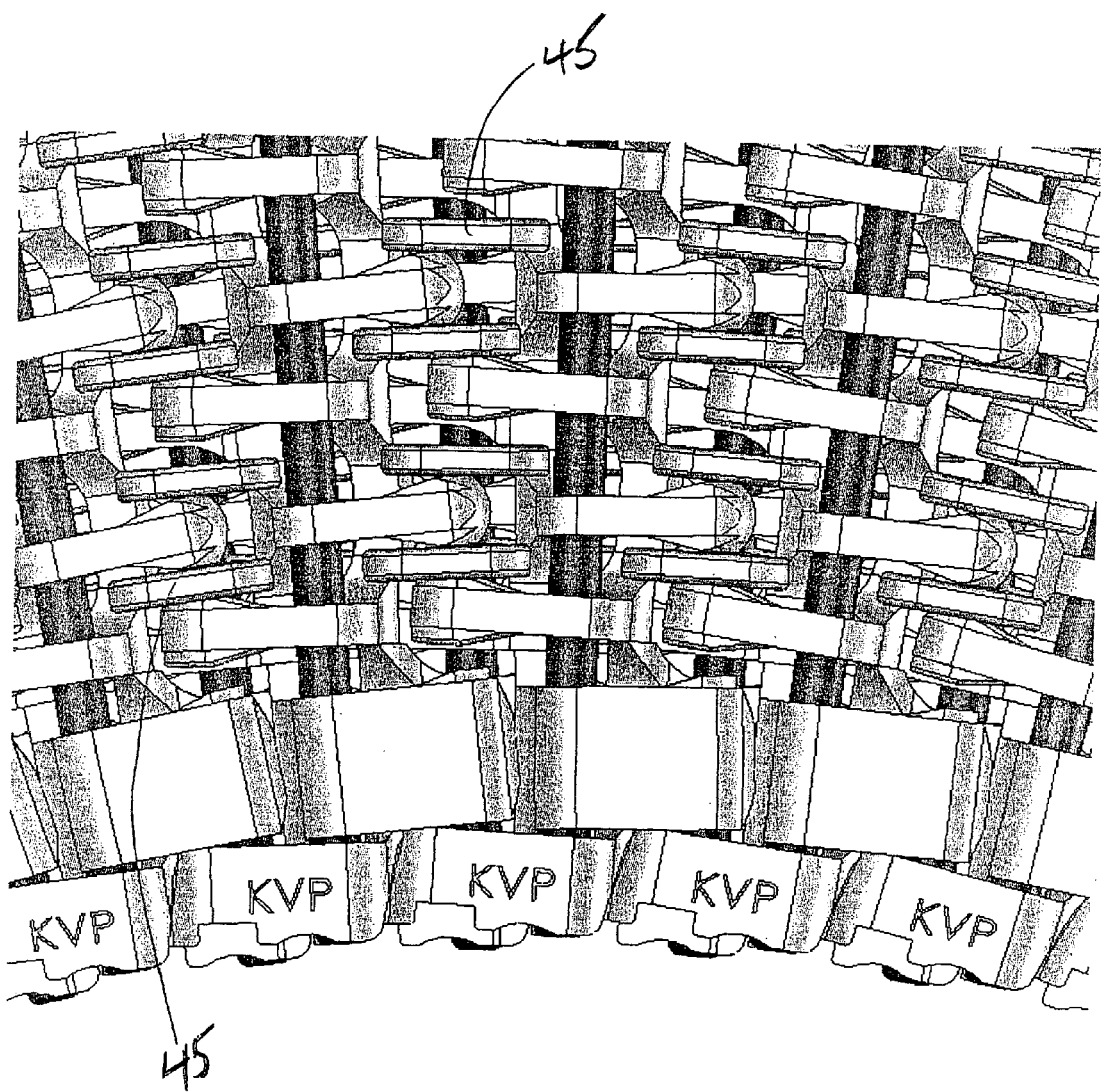
Figure 13D:
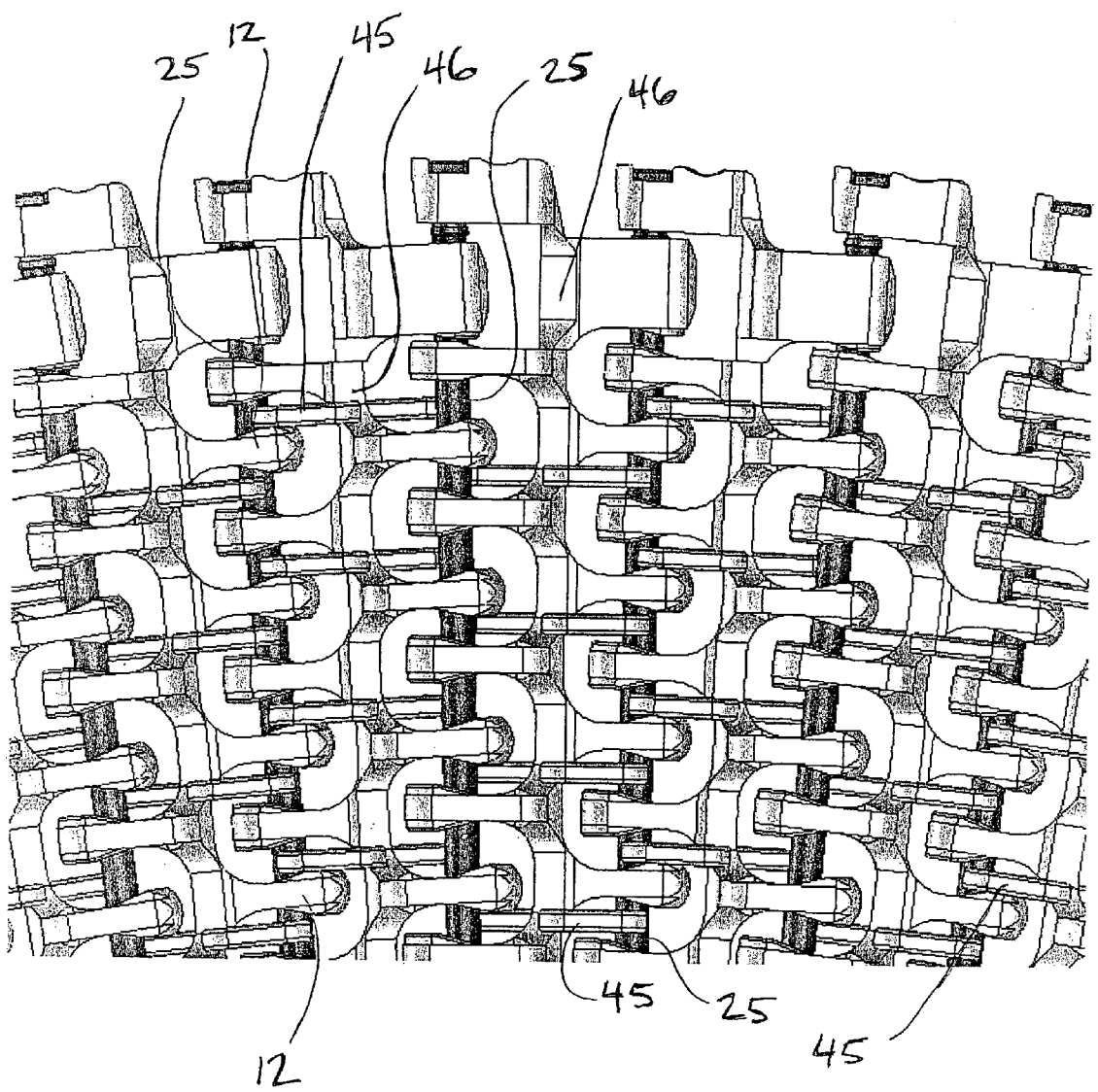
Figure 14:
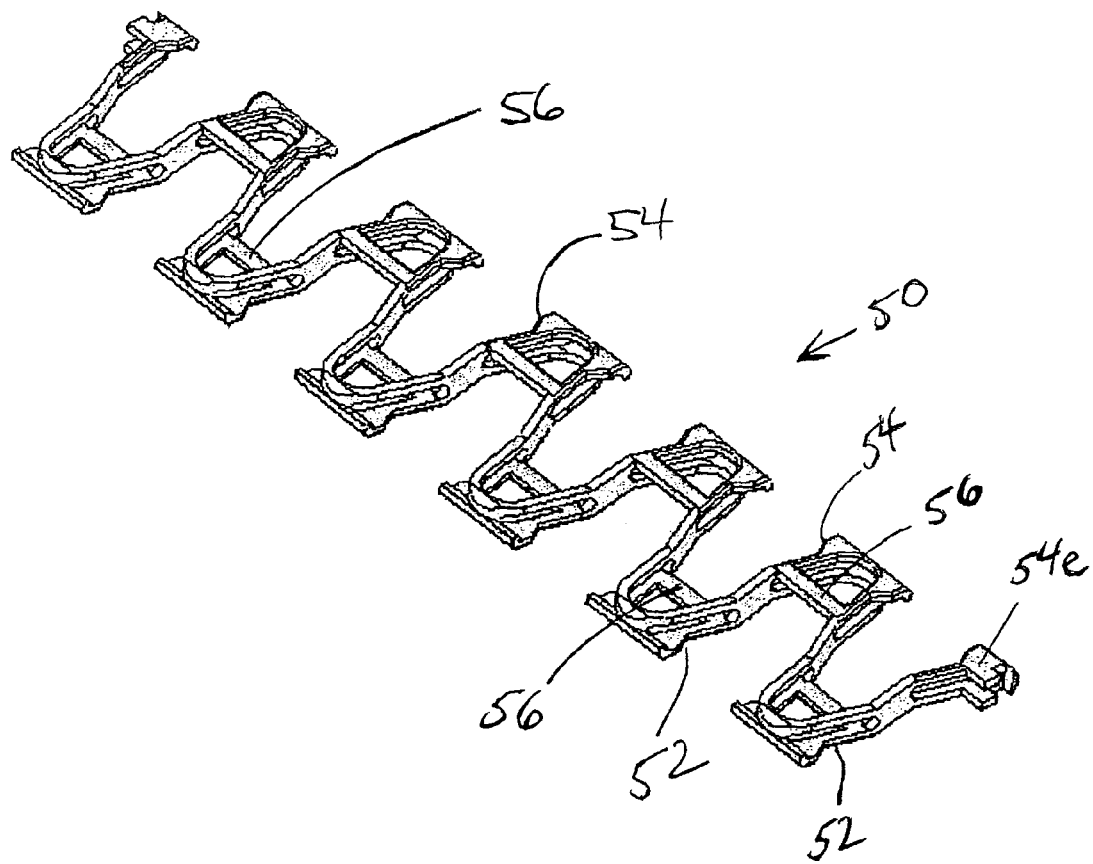
FIG. 14 is a perspective view showing a single module for a tight turn radius belt according to a third principal embodiment of the invention.
Figure 15:
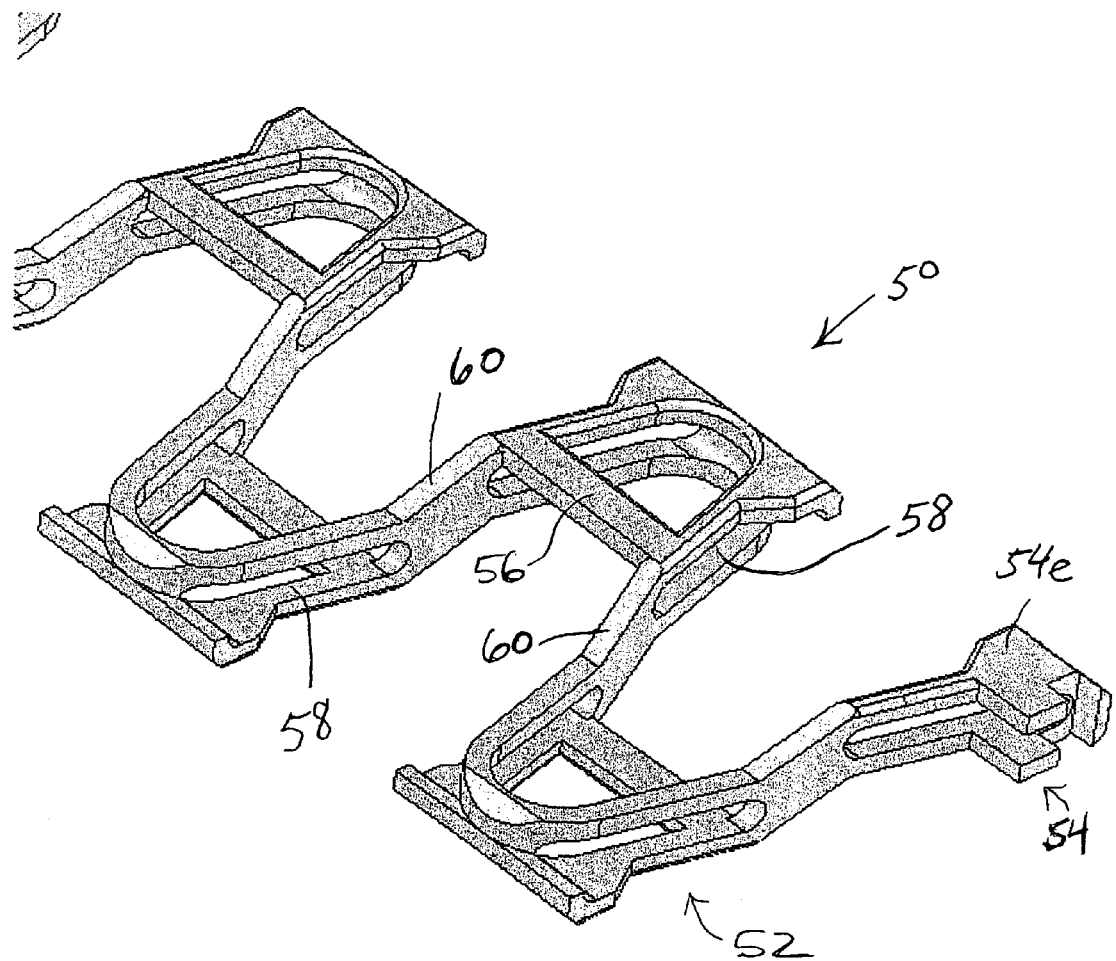
FIG. 15 is a close up perspective view showing a portion of the module in FIG. 14.

FIG. 13D shows that dummy link ends 45, at the outer regions of the belt on a curve as shown, can be positioned to make contact with a connecting pin or rod 25, the slender dummy link end being connected to the spine 46 as shown and not interfering with an adjacent link end 12 or 14 from the next adjacent module row. FIG. 13C shows the belt at the inside of a curve, where the modules and connecting pins are collapsed together as discussed above relative to FIGS. 1–5, and again shows that the dummy link ends 45 do not interfere with the collapsing together and overlapping of regular link ends. The dummy link ends are still positioned to bear against a connecting rod over which the dummy link ends extend, but this effect at the inner side is not as important as it is at the outer side of the belt, where belt tension is high.

FIGS. 14–18 show a third principal embodiment of the invention for achieving a very tight turn radius. A module 50 of this embodiment is formed as a series of V shapes or U shapes, e.g. a U shape alternating with an inverted U shape, followed by a U shape, etc. This general shape is similar to belts such as shown in U.S. Pat. No. 5,906,270, for example. First and second link ends 52 and 54 are formed in opposite directions of the module, and the module preferably has no central spine. A bridging lateral strut 56 preferably is included on each link end, toward the outer end of the link as shown. The modules 50 are invertable and universal, in the manner of the modules 10 shown in the first embodiment.

As in the other embodiments, these modules include elongated aperture slots 58, in both the first link ends 52 and the second link ends 54. Also, as in the other embodiments, each module has high link ends in one direction and low link ends in the other direction. A bridging region 60 connects first and second link ends in the undulating pattern, and this bridging section is obliquely angled so as to transition between the low and high positions of the oppositely-directed link ends 52 and 54. An edge second link end 54e is somewhat different, as shown, forming the end of the undulating pattern.

Figure 16:
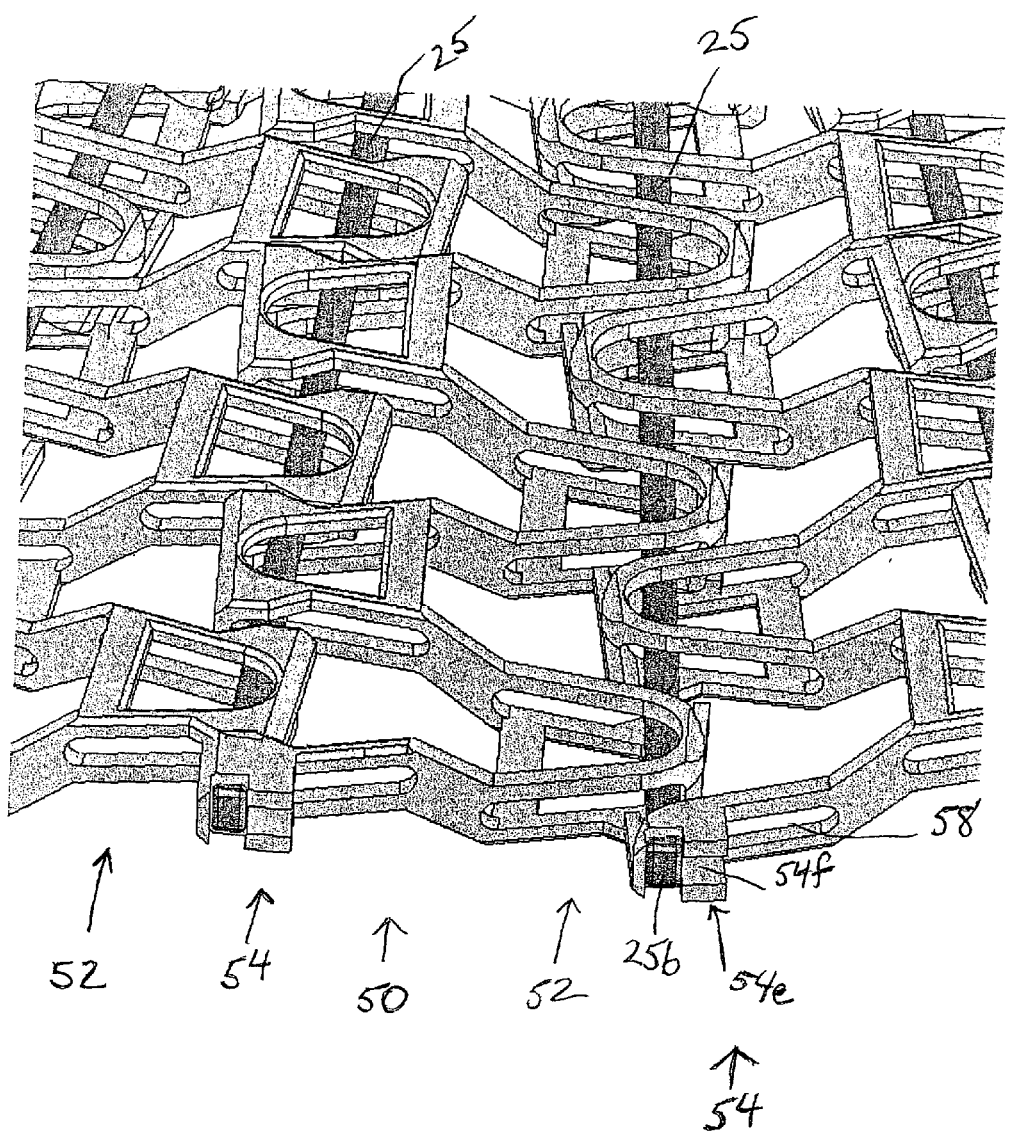
FIG. 16 is a perspective view showing a portion of a belt formed of modules as in FIGS. 14 and 15, particularly illustrating the outer side of a belt on a curve.
Figure 17:
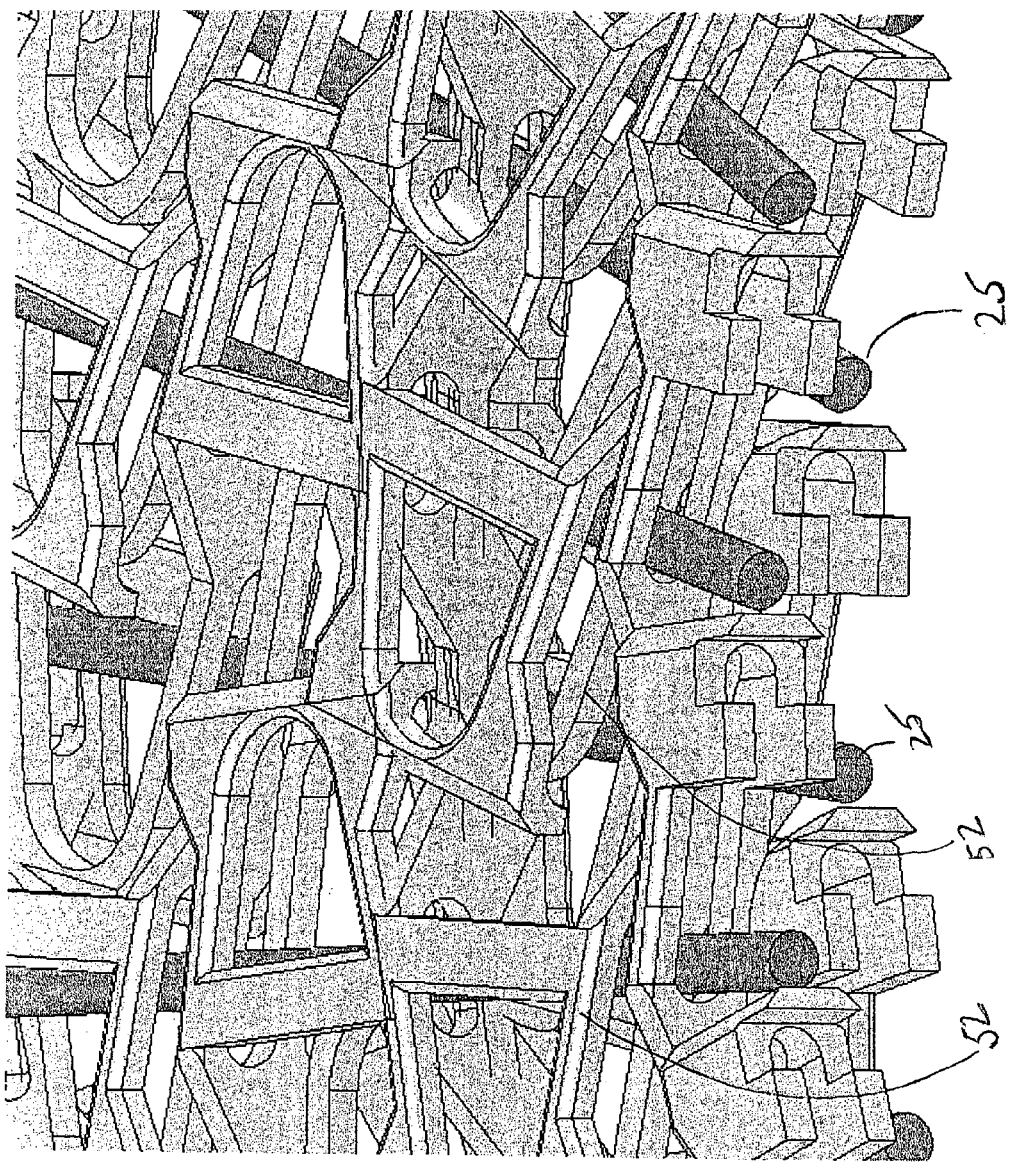
FIG. 17 is a perspective view showing a portion of the belt at the inner edge, where the modules are clustered very closely together.
Figure 18:
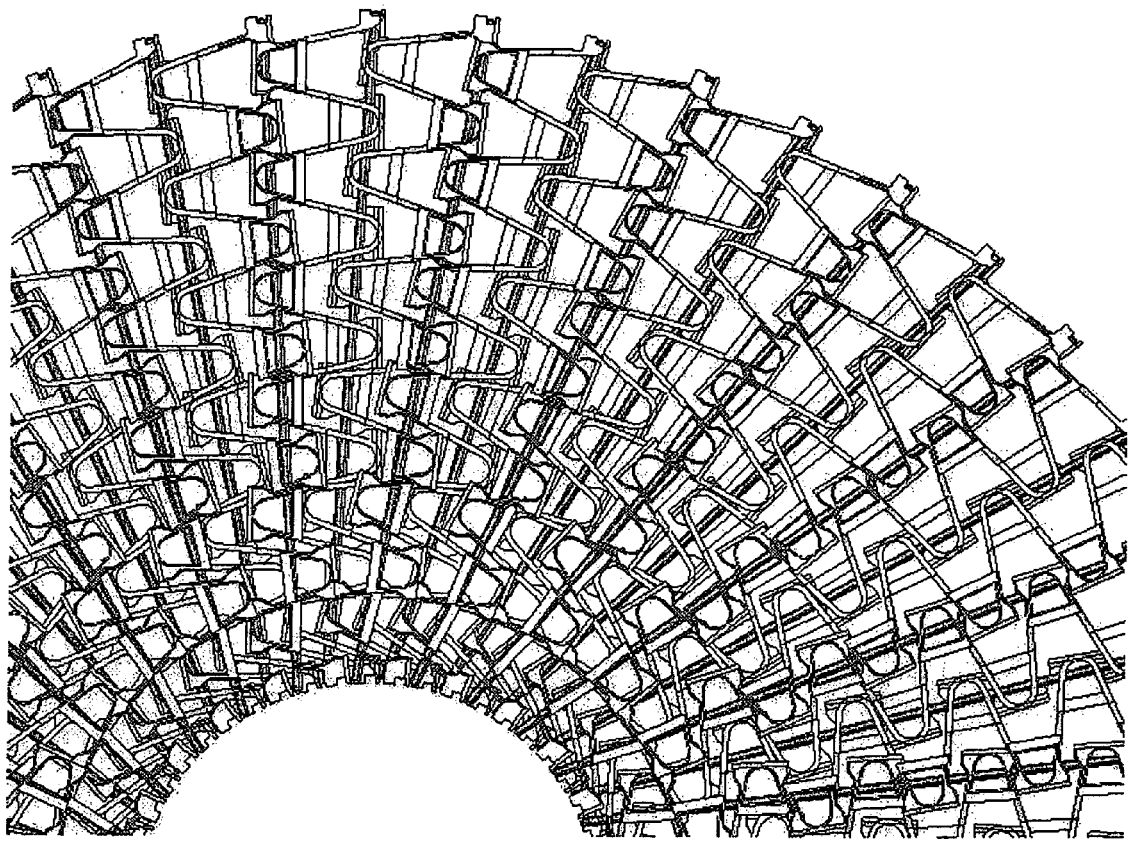
FIG. 18 is a plan view showing a portion of the assembled belt of the type illustrated in FIGS. 14–17.

FIG. 16 shows the outer edge of a belt made up the modules 50, while FIG. 17 shows the collapsed inner edge. FIG. 18 shows a section of the entire belt, revealing both outer and inner edges. As indicated, the module rows are assembled high—high and low—low as in the other embodiments. FIG. 16 shows that the outer ends of the connecting rods or pins 25 can be fixed in position (as in the first embodiment), by a pin head structure 25b that snaps into position in a special rod end capturing structure 54f of the special edge link end 54e. This holds the rod end in a fixed position relative to the slotted aperture 58 on the link end 54e, only at the outer edge, and it prevents rotation of the rod. Other types of pin retention can be used.

In FIG. 17 the modules are shown collapsed together and overlapped in essentially the same manner as described above relative to the first embodiment. The high link ends slide over and above the next adjacent connecting rod 25, and they ride over the adjacent link end structures. As can be envisioned from FIG. 16 and seen in FIG. 17, a first high link end 52 at/near the edge slides through the "yoke" between the connecting and interdigited second link ends 54 of the adjacent module, and over and above the next adjacent low first link end 52 in the adjacent module, and preferably overlapping the connecting rod 25 at the next adjacent rod location, as shown. The high link end 52 approaches the next similar high link end 52 as shown in FIG. 17. The limitation as shown in FIG. 17 is engagement of the connecting pin against the inner limit of the slotted aperture of the immediately interdigited link ends. The slots could be somewhat deeper than shown, for deeper collapse.

FIG. 18 shows an arc of the entire width of the belt of FIGS. 16 and 17.

Although the embodiments shown in the drawings and described above are preferred forms of the invention, it should be understood that the general principle of the invention is the deep collapse of a modular conveyor belt at the inner edge on a curve, via overlapping of link ends such that link ends extending in one direction pass under or over aligned link ends of succeeding rows also extending in that same direction, and such that, preferably (but not necessarily), such a first direction link end overlaps a connecting pin at the next succeeding hinge line. This is accomplished using the configuration described above, wherein modules have high and low sets of link ends; but it could also be achieved in other ways. The link ends of the modules could be essentially in the same plane, but with shaped ends (preferably somewhat wedge shaped) to cause a first-direction link end to drive under or climb over the next adjacent similarly-situated first direction link end. This will cause the modules at the inside edge of the curve to assume inclined orientations, and in one form a sort of crisscrossed orientation with alternate module rows sloping in opposite directions. If the belt is wide and has some flexibility, the belt at the outside of the curve will remain essentially in a plane.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A modular conveyor belt capable of radius travel and made up of a multiplicity of assembled plastic belt modules in module rows, the belt being connected together from row to row by connecting pins extending along hinge lines, the pins passing through apertures in link ends of the modules extending in the forward direction of travel and in the aft direction, the link ends of adjacent module rows being interdigited, and comprising:

the link ends extending from the modules in both fore and aft directions having slots at said apertures, to receive the connecting pins, in each module, the link ends comprising a forward set and an aft set of link ends, one set being at a high level and the other set at a low level, and the modules being assembled and interdigited such that high link ends of one module row connect with high link ends of an adjacent module row, and low link ends of the one module row connect with low link ends of another adjacent module row, whereby on collapse of modules together at the inner side of a curve in radius travel of the conveyor belt, high link ends that extend in a first direction fore or aft pass over and overlap low link ends of an adjacent module also extending in the first direction in a next adjacent module row, and such high link ends ride over a connecting pin in the next adjacent module row, providing for tight collapse of the belt at the inner edge on a curve.

2. The modular conveyor belt of claim 1, wherein the belt achieves a turn radius of about 0.3.

3. The modular conveyor belt of claim 1, wherein the modules have a center spine extending laterally, from which the two sets of link ends extend in essentially opposite directions.

4. The modular conveyor belt of claim 3, wherein link ends of the two sets on a module are formed essentially in alignment, with a forward link end and an aft link end extending from essentially the same location on the center spine.

5. The modular conveyor belt of claim 3, wherein the forward and aft sets of link ends on a module are staggered in position along the center spine.

6. The modular conveyor belt of claim 5, wherein the link ends comprise essentially oval loops defining elongated slots as apertures to receive the connecting pins, and wherein collapse at the inner side of the belt on a curve is limited by a high link end in a first direction that extends over a low link of a next rod module row extending in the first direction and makes contact with a high link end extending in a forward direction in a further succeeding module row, and similarly essentially limited by a low link end extending in the first direction that passes under a high link end extending in said first direction of an adjacent module row and makes contact with a low link end extending in said first direction in a further succeeding module row.

7. The modular conveyor belt of claim 6, wherein the connecting pins are retained in position in the belt with heads on the pins seated in pin saddles formed in outer edge structure of modules at the belt on a curve.

8. The modular conveyor belt of claim 7, wherein the pin heads are non-circular and the pin saddles are similarly non-circular, with the pin saddles closely fitted to grip the pin heads and retain them in place against rotation or lateral movement.

9. The modular conveyor belt of claim 1, wherein each module is formed in a generally undulating, sinuous configuration of repeated U-shapes or V-shapes that alternate between upright and inverted configurations along the width of the belt to define the forward and rear sets of link ends.

10. The modular conveyor belt of claim 1, wherein each module is formed in a corrugated or undulating configuration through the width of the module, forming along the width of the module a generally U-shaped forward link end, a next adjacent generally inverted U-shaped rearward link end, then another forward link end, and so on.

11. In a modular plastic conveyor belt assembled from a multiplicity of plastic modules in module rows each made up of one or more modules, the belt adapted to travel in a direction generally perpendicular to the module rows and to travel around curves at least in one direction of curvature, each module having a series of first link ends or knuckles and a series of second link ends or knuckles, the first and second link ends extending in opposite directions from one another and generally perpendicular to the width of the module rows, the link ends each having an aperture, with the apertures of a series of link ends aligned to receive a connecting rod extending through apertures of first link ends of one module row and second link ends of an adjacent module row when the link ends of the two module rows are interdigited in overlapping relationship, a construction permitting a very tight turning radius for the belt, comprising:

the apertures of both the first link ends and the second link ends comprising elongated slots permitting deep overlap at inner edges of the module rows at the inside of a curve, and means on the modules for causing link ends at and near the inner edge of the belt on a curve to cluster together and overlap to the extent that a link end of the first set overlaps a first set link end of a next adjacent module row and overlaps the next succeeding connecting rod in the belt as the interdigited link ends at the inner edge of the belt deeply overlap.

12. A modular plastic conveyor belt as in claim 11, wherein the means for causing link ends to cluster together includes means for causing some link ends to pass under link ends of modules in an adjacent row.

13. A modular plastic conveyor belt as in claim 11, wherein the means for causing link ends to cluster together comprises modules having high link ends extending in one direction and low link ends extending in an opposite direction, with modules assembled and interdigited such that high link ends of one module row connect with high link ends of an adjacent module row, and low link ends of the one module row connect with low link ends of another adjacent module row.

14. A modular plastic conveyor belt as in claim 11, wherein the first link ends are staggered in position with the second link ends on each module, such that a first link end of one module row rides over and laps over a similarly situated first link end of a next succeeding module row, serving as said means for causing link ends to cluster together.

15. A modular plastic conveyor belt as in claim 11, wherein the modules have high and low sets of link ends extending in respective opposite directions, serving as said means for causing link ends to cluster together.

* * * * *